(12) United States Patent
Rodriguez et al.

(10) Patent No.: US 8,704,917 B2
(45) Date of Patent: Apr. 22, 2014

(54) DISTRIBUTION OF OFFERED DIGITAL ZOOM LEVELS AND GRADUAL ZOOM IN DIGITAL PHOTOGRAPHY

(71) Applicant: Research in Motion Limited, Waterloo (CA)

(72) Inventors: Miguel Angel Rodriguez, Wellington, FL (US); Sung Ho Hong, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/668,475

(22) Filed: Nov. 5, 2012

(65) Prior Publication Data

US 2013/0057731 A1 Mar. 7, 2013

Related U.S. Application Data

(63) Continuation of application No. 12/819,611, filed on Jun. 10, 2010, now Pat. No. 8,330,832.

(60) Provisional application No. 61/219,645, filed on Jun. 23, 2009, provisional application No. 61/219,656, filed on Jun. 23, 2009, provisional application No. 61/219,651, filed on Jun. 23, 2009.

(51) Int. Cl.
    *H04N 5/262* (2006.01)
(52) U.S. Cl.
    USPC ....................................... 348/240.2
(58) Field of Classification Search
    USPC ....................................... 348/240.2
    See application file for complete search history.

(56) References Cited

U.S. PATENT DOCUMENTS

| 5,838,371 A | 11/1998 | Hirose et al. |
| 6,559,888 B1 | 5/2003 | Doron |
| 6,947,074 B2 | 9/2005 | Koseki et al. |
| 7,142,236 B2 | 11/2006 | Matsumura |

(Continued)

FOREIGN PATENT DOCUMENTS

| CN | 101326816 A | 12/2008 |
| WO | 02080523 | 10/2002 |
| WO | 2007123261 | 11/2007 |

OTHER PUBLICATIONS

International Search Report and Written Opinion mailed Oct. 7, 2010, in corresponding PCT patent application No. PCT/CA2010/000976.

(Continued)

*Primary Examiner* — Albert Cutler
(74) *Attorney, Agent, or Firm* — Novak Druce Connolly Bove + Quigg LLP

(57) ABSTRACT

Offered digital zoom levels may be distributed at equal spacing of zoom factors. Offered digital zoom levels may be distributed among optically uniform digital zoom levels. Gradual zoom may be achieved by generating preview images at one or more intermediate digital zoom levels at which generation of a recordable image is not permitted. One or more intermediate digital zoom levels may be distributed generally evenly between two adjacent offered digital zoom levels. An image sensor supports a discrete set of zoom factors. One or more intermediate zoom factors may be distributed generally evenly between zoom factors that correspond to two adjacent offered digital zoom levels.

11 Claims, 13 Drawing Sheets

(56) References Cited

U.S. PATENT DOCUMENTS

| | | | |
|---|---|---|---|
| 7,453,498 | B2 | 11/2008 | Prentice et al. |
| 7,477,297 | B2 | 1/2009 | Pollard |
| 7,561,192 | B2 * | 7/2009 | Kobayashi ............... 348/240.2 |
| 7,711,258 | B2 * | 5/2010 | Yanagi ........................ 396/88 |
| 2004/0183927 | A1 | 9/2004 | Hirakoso |
| 2004/0212688 | A1 | 10/2004 | Takano et al. |
| 2006/0125937 | A1 | 6/2006 | LeGall et al. |
| 2008/0192129 | A1 | 8/2008 | Walker et al. |
| 2008/0239103 | A1 | 10/2008 | Bocking et al. |

OTHER PUBLICATIONS

Extended European Search report mailed Aug. 30, 2010, in corresponding European patent application No. 10166709.5.

STMicroelectronics; "VD6725 Camera Sensor Data Sheet"; published Apr. 2008.

Examination Report mailed Jan. 8, 2014, in corresponding European patent application No. 10166709.5.

English translation of the First Office Action mailed Dec. 3, 2013; in corresponding Chinese patent application No. 201080028186.1.

English abstract for CN101326816; published on Dec. 17, 2008 and retrieved on Feb. 24, 2014.

* cited by examiner

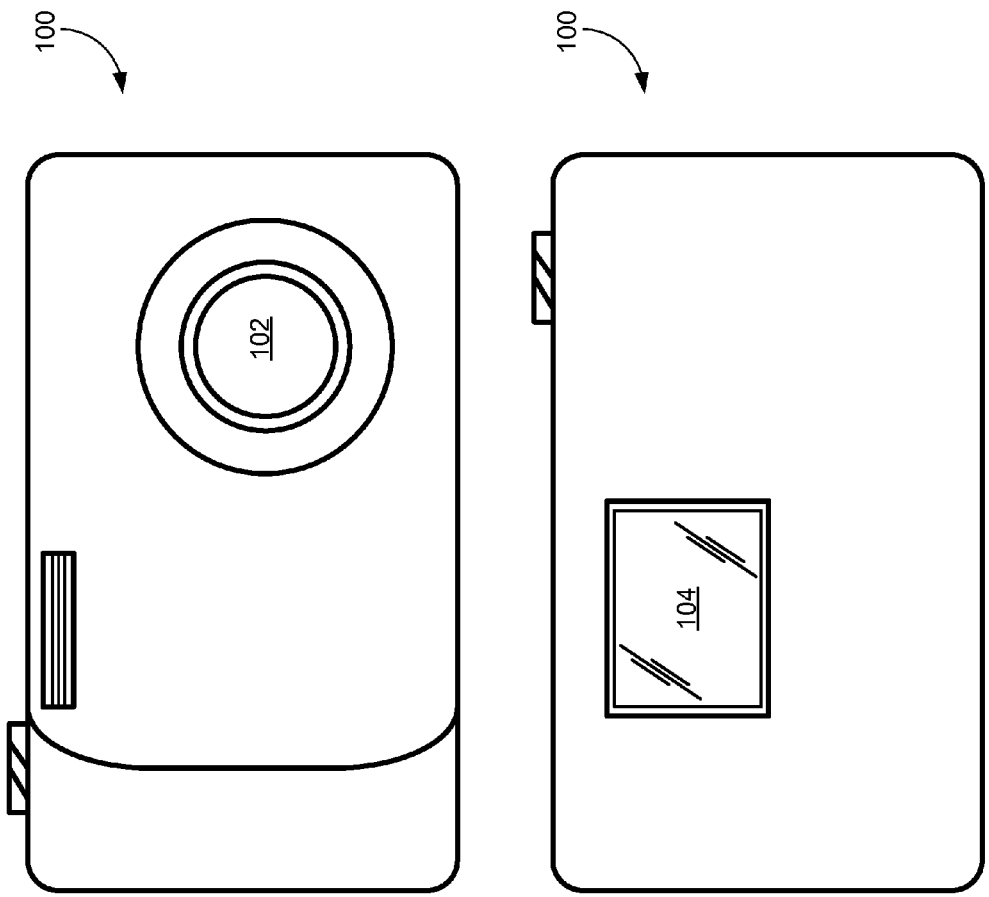

1x

1x

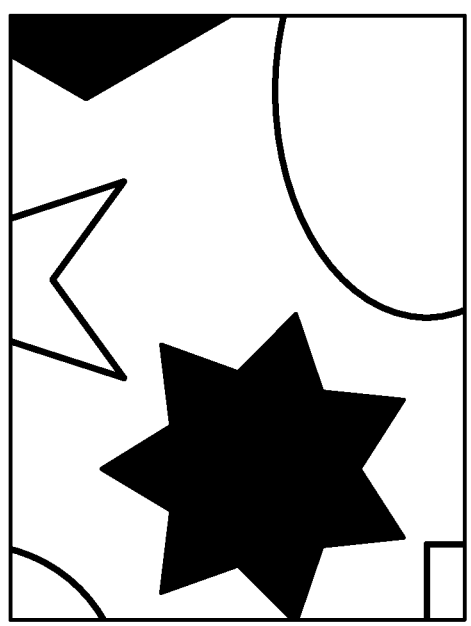
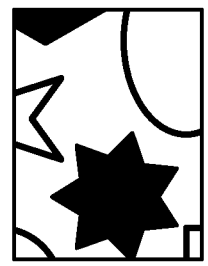
FIG. 4-1
FIG. 4-2

3x

3x

DISTRIBUTION OF OFFERED DIGITAL ZOOM LEVELS AND GRADUAL ZOOM IN DIGITAL PHOTOGRAPHY

TECHNICAL FIELD

This disclosure is generally related to the technical field of digital zoom. A host device in which digital camera functionality is integrated may be a standalone digital camera or may have additional functionality. A mobile electronic device with digital camera functionality is an example of a host device.

BACKGROUND

A host device in which digital camera functionality is integrated includes an arrangement of one or more optical elements and image sensor. Optical zoom capabilities are available if a focal length of the arrangement of optical elements can be changed, usually through mechanical means. Digital zoom capabilities are implemented electronically and are available without the need for a change in the focal length of the arrangement of one or more optical elements.

The term "pixel", short for "picture element", is used herein with different meanings, depending on the context: an image sensor, a display module, or a digital representation of an image. In the context of a digital representation of an image, a pixel is the smallest element of the digital representation of the image.

An image sensor will include a pixel array comprising photosensitive material. The pixel array is an array of very fine electronic pixels arranged in horizontal rows and vertical columns. Such an image sensor, for example, a charge coupled device (CCD) or complementary metal oxide semiconductor (CMOS) image sensor, is capable of receiving and capturing radiant energy, and converting the radiant energy into electronic signals that become a virtual representation of an optical image. When digital camera functionality is described as a two-megapixel, three-megapixel or five-megapixel, this is an approximate description of the number of pixels in the image sensor's pixel array. As used herein, the term captured image refers to the image read from the pixel array, discounting any margin or border pixels. For example, a two-megapixel digital camera may produce a captured image of 1600 by 1200 pixels.

A host device in which digital camera functionality is integrated typically includes a display module to display a preview image that is derived from the captured image. Looking at the preview image may assist a user of the host device in taking a photograph using the digital camera functionality, since the preview image provides the user with visual feedback as to what the digital camera "sees". The display module includes a pixel array, which is an array of pixels arranged in horizontal rows and vertical columns. Depending on the technology for the pixel array, the pixels may comprise photo-emitting material, or may by controllable, as in liquid crystal display (LCD) technology, to block light or permit the transmission of light in varying degrees. Other technologies for pixel arrays in display modules are known in the art. The number of pixels in a pixel array of the display module is typically smaller than the number of pixels in the captured image. For example, a display may have 320 by 240 pixels.

Digital zoom is accomplished by cropping an image to retain a center part of the image with the same aspect ratio as the original and to discard the rest of the image. The retained portion is referred to herein as the cropped image, including cases where the entire image is retained. At a digital zoom level of 1×, no cropping is performed and the entire image is retained. The cropped image is therefore identical to the image before cropping. At a digital zoom level of 2×, about one quarter of the image is retained. At a digital zoom level of 3×, about one ninth of the image is retained.

A host device in which digital camera functionality is integrated may be designed to offer two or more digital zoom levels. The host device will be designed so that input provided via at least one of its user input components results in a change in the digital zoom from one offered digital zoom level to another offered digital zoom level. The cropped image and hence the preview image will change as the digital zoom changes from one offered digital zoom level to another offered digital zoom level. A user may perceive abruptness in the preview image as the digital zoom changes from one offered digital zoom level to another.

In practice, images include noise resulting from a variety of sources. Noise in an image may appear, for example, as a speckle or a pixel in a color or shade of gray unrelated to that of its neighboring pixels. The preview image is refreshed at a refresh rate, which may be fixed or variable. For example, the refresh rate may be set to 15 times per second in bright lighting conditions and to 8 times per second in dim lighting conditions. Noise in the preview image may therefore be particularly noticeable by a user, since the noise will differ from one preview image to another, even when the preview images are all at the same offered digital zoom level.

BRIEF DESCRIPTION OF THE DRAWINGS

The technology described herein is illustrated by way of example and not limitation in the figures of the accompanying drawings, in which like reference numerals indicate corresponding, analogous or similar elements, and in which:

FIG. 1-1 is a front view of an example standalone digital camera;

FIG. 1-2 is a rear view of the example standalone digital camera illustrated in FIG. 1-1;

FIG. 2-1 is a front view of an example mobile electronic device in which digital camera functionality is integrated;

FIG. 2-2 is a rear view of the example mobile electronic device illustrated in FIG. 2-1;

FIG. 3-1 is an illustration of an example captured image, obtained when example digital camera functionality is operated at digital zoom level 1×;

FIG. 3-2 is an illustration of an example preview image that is a scaled-down version of the captured image illustrated in FIG. 3-1;

FIG. 4-1 is an illustration of an example cropped image, obtained when the example digital camera functionality is operated at digital zoom level 2×;

FIG. 4-2 is an illustration of an example preview image that is a scaled-down version of the cropped image illustrated in FIG. 4-1;

FIG. 5-1 is an illustration of an example cropped image, obtained when the example digital camera functionality is operated at digital zoom level 3×;

FIG. 5-2 is an illustration of an example preview image that is a scaled-down version of the cropped image illustrated in FIG. 5-1;

FIG. 8-1 is an illustration of a sequence of example preview images that are scaled-down versions of example cropped images obtained when example digital camera functionality is operated at digital zoom levels 1×, 1.25×, 1.5×, 1.75× and 2×;

FIG. 8-2 is an illustration of a sequence of example preview images that are scaled-down versions of example cropped images obtained when the example digital camera functionality is operated at digital zoom levels 1× and 2×;

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of the technology. For example, numerical values in the tables provided below are given for purposes of illustration. However it will be understood by those of ordinary skill in the art that the technology described herein may be practiced without these specific details. In other instances, well-known methods, procedures, components and circuits have not been described in detail so as not to obscure the description of the technology.

Figure 2:
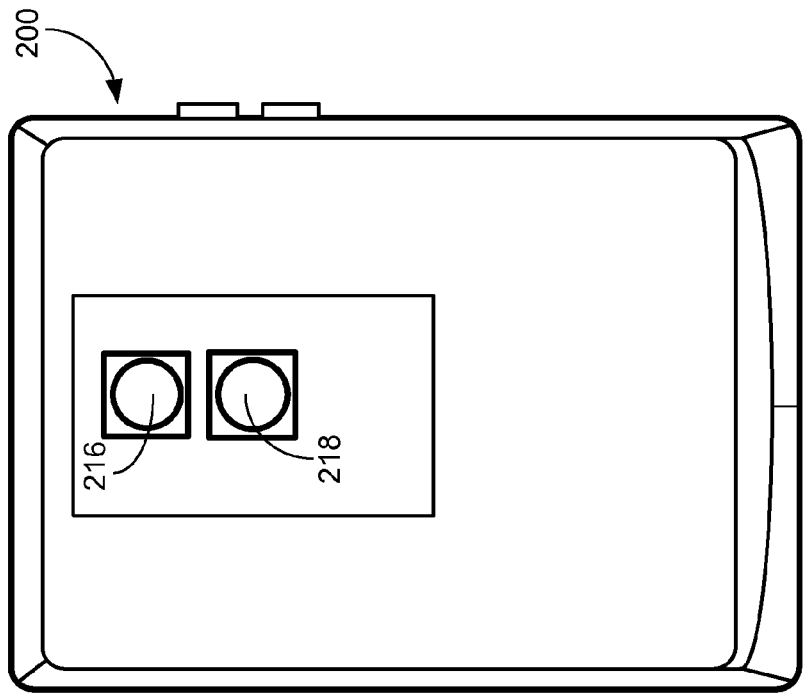
Figures 1, 2:
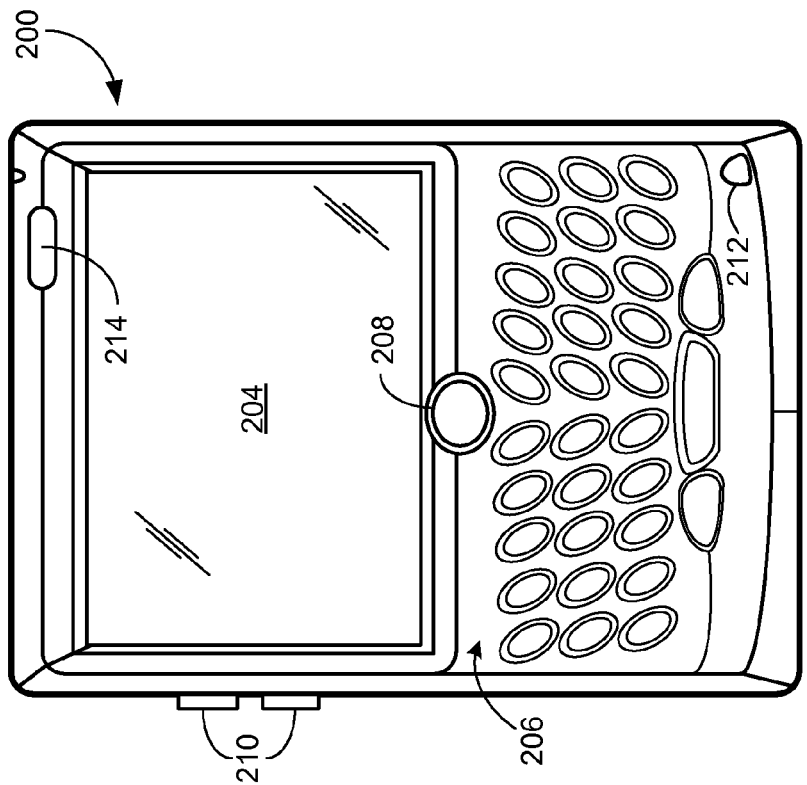

FIG. 1-1 is a front view of an example standalone digital camera, generally referenced 100, and FIG. 1-2 is a rear view of standalone digital camera 100. A lens 102 of standalone digital camera 100 is shown in FIG. 1-1. A display module 104 is shown in FIG. 1-2. When standalone digital camera 100 is operated, light focused by lens 102 results in the capture of an image by the image sensor (not shown) of standalone digital camera 100, and a preview image derived from the captured image is displayed by display module 104.

FIG. 2-1 is a front view of an example mobile electronic device in which digital camera functionality is integrated. The example mobile electronic device is generally referenced 200. A display module 204 is shown in FIG. 2-1. Various user input components of mobile electronic device 200 are shown in FIG. 2-1, including, for example, a keyboard 206, a trackball 208, buttons 210 and a microphone 212. If display module 204 comprises a touchscreen then display module 204 is also a user input component. Other user input components are also contemplated. Various user output components of mobile electronic device 200 are shown in FIG. 2-1, including, for example, a speaker 214 and display module 204. Other user output components are also contemplated. FIG. 2-2 is a rear view of mobile electronic device 200. A flash 216 and a lens 218 are shown in FIG. 2-2. When the digital camera functionality is operated, light focused by lens 218 results in the capture of an image by the image sensor (not shown), and a preview image related to the captured image is displayed by display module 204.

Since the preview image is not necessarily identical to the cropped image, two images are produced. The image sensor may generate both the cropped image and the preview image, in which case the image sensor is capable of implementing a scaling algorithm. Alternately, the image sensor may generate the cropped image, and the host device may generate the preview image from the cropped image by implementing a scaling algorithm. The image sensor may be configurable by the host device as to whether or not the image sensor generates the preview image. In some implementations, the cropped image is generated by the host device from output of the image sensor. The dimensions of the preview image are referred to herein as the display dimensions.

Figures 2, 3:
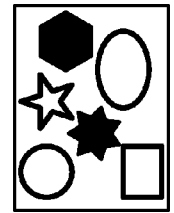
Figures 1, 3:
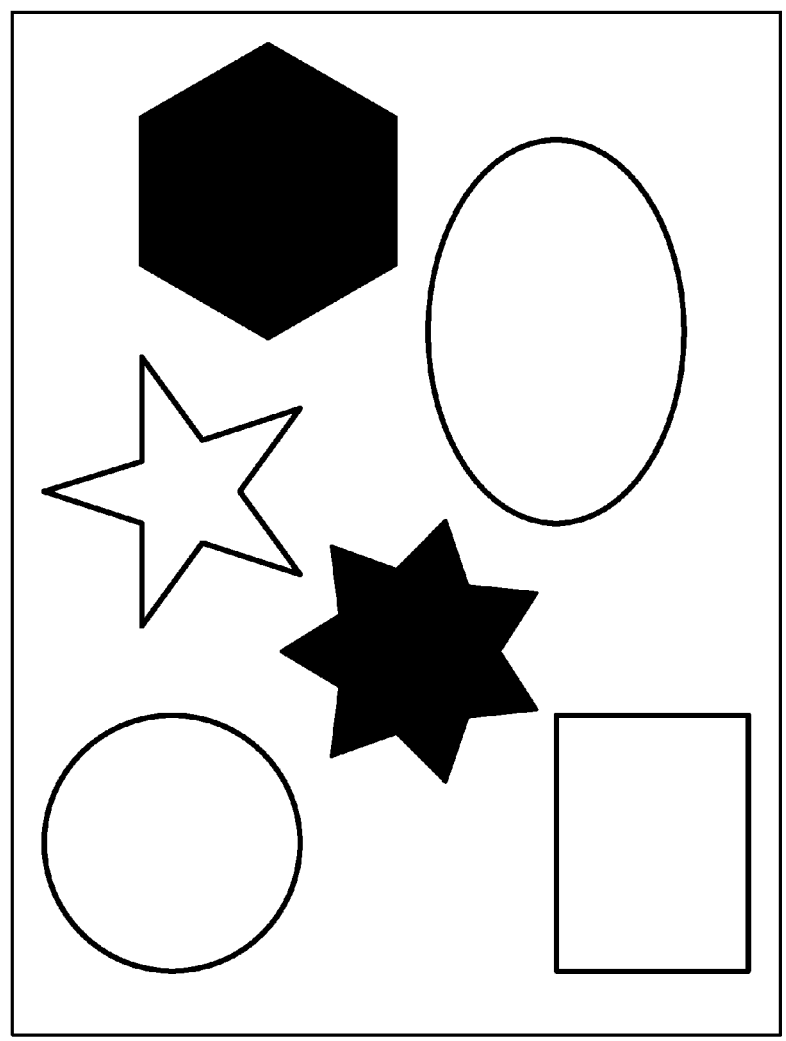

FIG. 3-1 is an illustration of an example captured image, obtained when example digital camera functionality is operated at digital zoom level 1×. FIG. 3-2 is an illustration of an example preview image that is a scaled-down version of the captured image illustrated in FIG. 3-1.

FIG. 4-1 is an illustration of an example cropped image, obtained when the example digital camera functionality is operated at digital zoom level 2×. The cropped image illustrated in FIG. 4-1 is generated by retaining a center part of the captured image illustrated in FIG. 3-1 and discarding the rest of the captured image. FIG. 4-2 is an illustration of an example preview image that is a scaled-down version of the cropped image illustrated in FIG. 4-1.

Figures 2, 5:
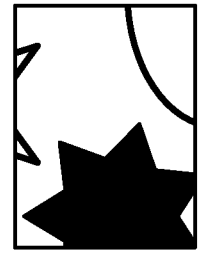
Figures 1, 5:

FIG. 5-1 is an illustration of an example cropped image, obtained when the example digital camera functionality is operated at digital zoom level 3×. The cropped image illustrated in FIG. 5-1 is generated by retaining a center part of the captured image illustrated in FIG. 3-1 and discarding the rest of the captured image. FIG. 5-2 is an illustration of an example preview image that is a scaled-down version of the cropped image illustrated in FIG. 5-1.

Some examples of digital zoom levels and dimensions of cropped images corresponding to those digital zoom levels for a captured image of 1600 by 1200 pixels are listed in Table 1 below.

TABLE 1

| Digital Zoom Level | Dimensions of Cropped Image | |
|---|---|---|
| | Width | Height |
| 1× | 1600 | 1200 |
| 2× | 800 | 600 |
| 3× | 533 | 400 |
| 4× | 400 | 300 |
| 5× | 320 | 240 |

A variety of techniques for handling changes in digital zoom are proposed herein, to be used alone or in any combination. These techniques, when used alone or in any combination, may improve a user's experience of digital zoom as perceived when viewing the preview images displayed by a display module. Some of these techniques may be implemented in a way that affects only the preview images. Others of these techniques may be implemented in a way that affects both the preview images and recordable images that are able to be recorded in a storage medium.

Technique 1: Number of Offered Digital Zoom Levels

Although the image sensor is able to support a smallest non-zero cropped image, the host device may be designed to limit offered digital zoom levels to no larger than a maximum offered digital zoom level. If the maximum digital zoom level offered is the ratio of the dimensions of the captured image to the dimensions of a preview image when the display module is in full-screen mode, then when the host device is operated at that maximum offered digital zoom level, the cropped image will be exactly the same size as the preview image when the display module is in full-screen mode. For example, if the captured image is 1600 by 1200 pixels and the preview image in full-screen mode is 320 by 240 pixels, the maximum offered digital zoom level as defined above is 5×. At lower digital zoom levels, the cropped image is larger than the preview image when the display module is in full-screen mode, and therefore the preview image will be a scaled-down version of the cropped image. Scaling algorithms are known in the art.

For a given minimum offered digital zoom level (usually 1×) and a given maximum offered digital zoom level, the number N of offered digital zoom levels is a matter for design. In an implementation where input via a user input component of the host device is required to transition from one offered digital zoom level to an adjacent offered digital zoom level, then input is required N−1 times to change from the minimum offered digital zoom level to the maximum offered digital zoom level or vice versa through all intervening offered digital zoom levels. If too many digital zoom levels are offered, a user of the host device may experience frustration at the time and effort involved in changing from the minimum offered digital zoom level to the maximum offered digital zoom level or vice versa through all intervening offered digital zoom levels. On the other hand, if too few digital zoom levels are offered, the user may perceive an undesirable abruptness in the preview image as the digital zoom changes from one offered digital zoom level to another, even if the change is to an adjacent offered digital zoom level. A total of anywhere from four to seven offered digital zoom levels, for example, five or six offered digital zoom levels, may provide a reasonable balance between the competing considerations of improving the smoothness of transitions among offered digital zoom levels and reducing the time and effort required to transition from the minimum offered digital zoom level to the maximum offered digital zoom level or vice versa through all intervening offered digital zoom levels.

The term "adjacent" in the context of offered digital zoom levels is used herein to mean an offered digital zoom level that is immediately preceding or following another offered digital zoom level in an ordered list of all offered digital zoom levels. For example, if the ordered list of offered digital zoom levels is {1×, 1.4×, 1.8×, 2.2×, 2.6×, 3×}, then digital zoom level 1.8× is adjacent to digital zoom level 1.4× and to digital zoom level 2.2×. In another example, if the ordered list of offered digital zoom levels is {1×, 2×, 3×, 4×, 5×}, then digital zoom level 1× is adjacent to digital zoom level 2×, digital zoom level 3× is adjacent to digital zoom level 2× and to digital zoom level 4×, and digital zoom level 5× is adjacent to digital zoom level 4×.

Digital Zoom Limited by Cropping Capabilities of Image Sensor

A host device in which digital camera functionality is integrated may use its host processor to handle the cropping of the captured image to implement digital zooming In such cases, the output of the image sensor is the captured image or an uncropped processed version of the captured image, and any cropped image dimensions smaller than the dimensions of the captured image are achievable by the host device.

However, if cropping to implement digital zooming is performed in the image sensor, then digital zooming is limited by the cropping capabilities of the image sensor. An image sensor may support a discrete set of zoom factors, each supported zoom factor corresponding to dimensions of a cropped image generated by the image sensor when the image sensor is configured for that supported zoom factor, such that any other dimensions of cropped images are unachievable by the image sensor. Furthermore, the relationship between the dimensions of a cropped image at any supported zoom factor to the dimensions of the captured image may be complex and will likely be specific to the image sensor. The set of supported zoom factors and corresponding dimensions of cropped images may be fixed. Alternately, one or more programmable parameters of the image sensor may affect the set of supported zoom factors or the corresponding dimensions of cropped images or both. The host device may program the one or more programmable parameters.

Some examples of zoom factors supported by an example image sensor capable of producing a captured image of 1600 by 1200 pixels and dimensions of cropped images corresponding to those supported zoom factors are listed in Table 2 below. These examples were selected as having cropped image dimensions closest to the cropped image dimensions in Table 1.

TABLE 2

| Label | Digital Zoom Level | Zoom Factor | Dimensions of Cropped Image | |
|---|---|---|---|---|
| | | | Width | Height |
| 1× | 1.00× | 1.00 | 1600 | 1200 |
| 2× | 1.99× | 3.45 | 804 | 602 |
| 3× | 3.02× | 4.30 | 530 | 396 |
| 4× | 3.99× | 4.70 | 402 | 300 |
| 5× | 5.00× | 5.00 | 320 | 240 |

Table 2 also includes digital zoom levels calculated according to the following equation and rounded to two decimal places:

$$ZoomLevel=Sqrt(AreaOfCapturedImage/AreaOfCroppedImage)$$

The host device may assign a label to each offered digital zoom level. Examples of such labels are included in the left-most column of Table 2 above. However, persons of ordinary skill in the art will recognize that the label "3×" in Table 2 corresponds to a digital zoom level of 3.02×, and not to a digital zoom level of 3×.

A cropped image of 804 by 602 pixels, which corresponds to digital zoom level 1.99×, is supported in the example image sensor with a zoom factor of 3.45. Similarly, a cropped image of 402 by 300 pixels, which corresponds to digital zoom level 3.99×, is supported in the example image sensor with a zoom factor of 4.75. The difference in numerical values for digital zoom levels and zoom factors, even when the dimensions of the cropped image resulting therefrom are almost identical, is due to the fact that the relationship between dimensions of a captured image, a digital zoom level, and dimensions of a cropped image corresponding to that digital zoom level is different from the relationship between dimensions of a captured image, a supported zoom factor, and dimensions of a cropped image corresponding to that supported zoom factor.

Furthermore, since the supported zoom factors form a discrete set, not all dimensions of cropped images are achievable by the image sensor. The example image sensor of Table 2 cannot achieve a cropped image of 533 by 400 pixels (corresponding to a digital zoom level of 3×). The closest dimensions to 533 by 400 pixels that the image sensor in this example can achieve are 530 by 396 pixels, which correspond to digital zoom level of 3.02× and a supported zoom factor of 4.30.

The cropped image illustrated in FIG. 4-1 and the corresponding preview image illustrated in FIG. 4-2 may be generated by having the image sensor of this example use a zoom factor of 3.45. The cropped image illustrated in FIG. 5-1 and the corresponding preview image illustrated in FIG. 5-2 may be generated by having the image sensor of this example use a zoom factor of 4.30.

The host device may use zoom translation information to translate between an indication of one of its offered digital zoom levels and a zoom factor supported by its image sensor. To continue the example of Table 2, a zoom translation table comprising the left-most and middle columns of Table 2 may be used. The zoom translation table is repeated below as Table 3.

TABLE 3

| Label | Zoom Factor |
|---|---|
| 1x | 1.00 |
| 2x | 3.45 |
| 3x | 4.30 |
| 4x | 4.70 |
| 5x | 5.00 |

Persons of ordinary skill in the art will recognize that the zoom translation information may be stored in any suitable format and not necessarily in tabular format. Further the indication of the offered zoom level corresponding to a particular supported zoom factor may be implicit from the format in which the supported zoom factors (or indications thereof) are stored.

Consider the example where the digital zoom is currently at the offered digital zoom level to which label "2x" is assigned, and input detected by the host device from its user input component is indicative of the offered digital zoom level to which the label "3x" is assigned. The host device controls the image sensor via the commands of the image sensor to adjust the image sensor from zoom factor 3.45 to zoom factor 4.30. If the zoom factors in the set supported by the image sensor are in incremental steps of 0.05, then 17 steps are needed to get from zoom factor 3.45 to zoom factor 4.30. For example, if the image sensor has a configurable parameter ZoomJumpSize, a command ZoomJumpIn that increases the zoom factor by ZoomJumpSize, and a command ZoomJumpOut that decreases the zoom factor by ZoomJumpSize, then the host device may configure ZoomJumpSize to a value that corresponds to 17 steps and issue the ZoomJumpIn command to the image sensor.

Technique 2: Gradual Digital Zoom

As mentioned above, a host device in which digital camera functionality is integrated and that offers two or more digital zoom levels is designed so that input provided via at least one of its user input components results in a change from one offered digital zoom level to another offered digital zoom level. The cropped image and hence the preview image will change as the digital zoom changes from one offered digital zoom level to another offered digital zoom level.

With gradual digital zoom, a change from a start offered digital zoom level to an end offered digital zoom level adjacent to the start offered digital zoom level, is accomplished via one or more intermediate zoom levels between the start offered digital zoom level and the end offered digital zoom level. These intermediate digital zoom levels are not offered digital zoom levels offered by a host device and generation of recordable images at these intermediate digital zoom levels is not permitted by the host device. However, preview images at these intermediate digital zoom levels are generated and available to be displayed by the display module.

Figure 6:
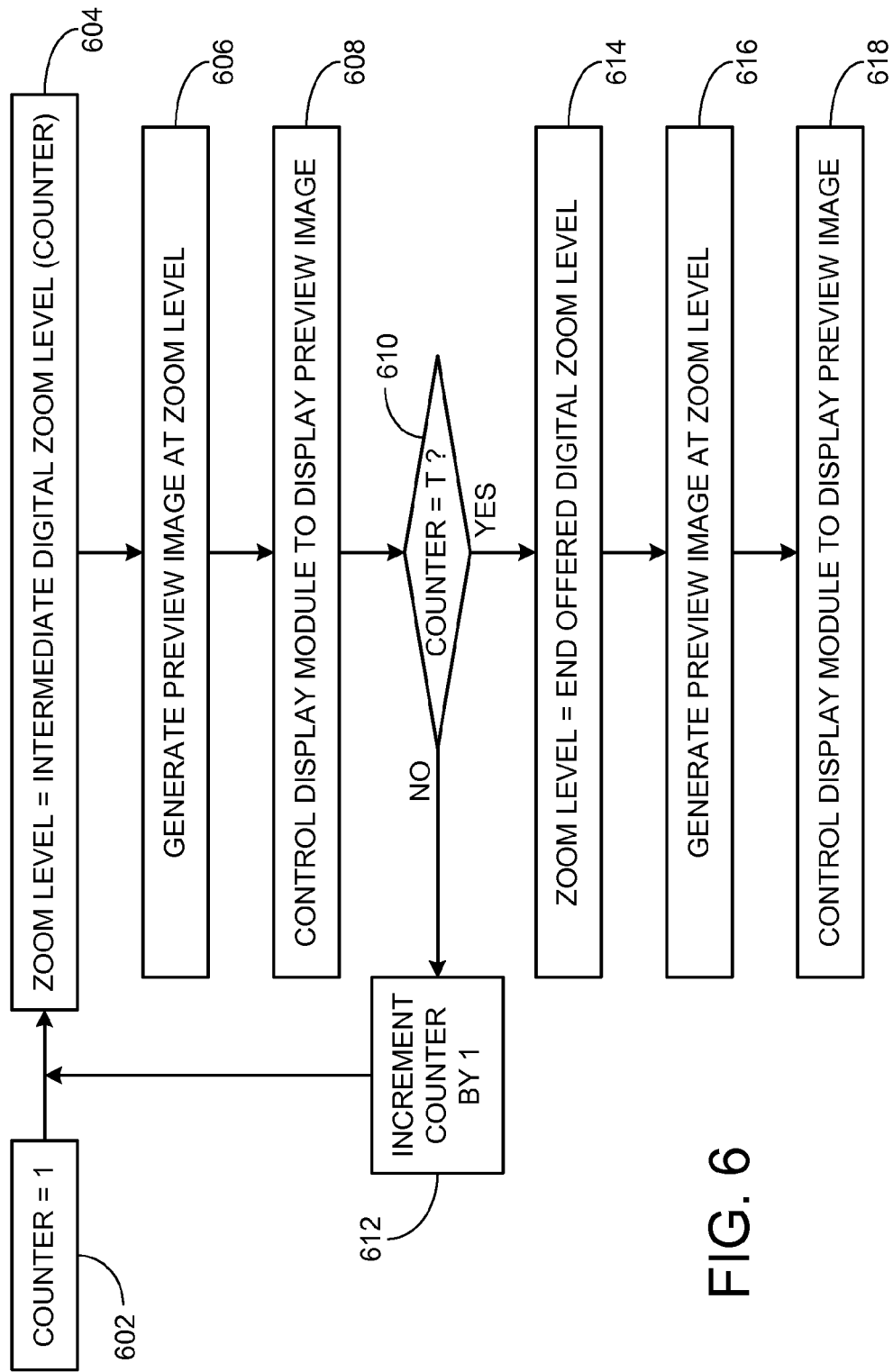
FIG. 6 is a flowchart illustration of a simplified example method for gradual digital zoom implemented in an example host device.

FIG. 6 is a flowchart illustration of a simplified example method for gradual digital zoom implemented in an example host device. For the purpose of this illustration, the intermediate digital zoom levels are indexed according to their proximity to the start offered digital zoom level, regardless of whether the start offered digital zoom level is higher or lower than the end offered digital zoom level. At 602, the host device sets a counter to 1. At 604, the host device sets a zoom level parameter to the intermediate digital zoom level indexed by the counter. At 606, the host device generates a preview image from a cropped image, where the dimensions of the cropped image correspond to the value of the zoom level parameter. At 608, the host device controls a display module to display the preview image generated at 606. At 610, the host device checks whether the value of the counter is equal to a positive integer T, which is the number of intermediate digital zoom levels between the start digital zoom level and the end offered digital zoom level. If not, then at 612, the host device increments the counter by 1 and continues the method from 604. In this manner, the host device iterates through all of the T intermediate digital zoom levels. If the value of the counter is equal to T, then at 614, the host device sets the zoom level parameter to the end offered digital zoom level, at 616, the host device generates a preview image from a cropped image, where the dimensions of the cropped image correspond to the end offered digital zoom level, and at 618, the host device controls a display module to display the preview image generated at 616.

A host device may implement gradual digital zoom by controlling the image sensor to change from a start zoom factor, which corresponds to the start offered digital zoom level, to an end zoom factor, which corresponds to the end offered digital zoom level, via one or more intermediate zoom factors between the start zoom factor and the end zoom factor. Each of these intermediate zoom factors corresponds to a respective one of the intermediate digital zoom levels.

If the image sensor includes processing capabilities, for example, the image sensor is a system-on-chip (SOC) image sensor, then it may be sufficient for the host device to provide the image sensor with an indication of the end zoom factor, and the image sensor may use its processing capabilities to implement gradual digital zoom internally by changing from the start zoom factor to the first intermediate zoom factor, followed by a change from the first intermediate zoom factor to the next intermediate zoom factor, if any, and so on, followed by a change from the last intermediate zoom factor to the end zoom factor. At each intermediate zoom factor and at the end zoom factor, the image sensor may generate cropped images dimensions of which correspond to the zoom factor. The image sensor may be configurable by the host device as to whether or not the image sensor implements gradual digital zoom internally.

Figure 7:
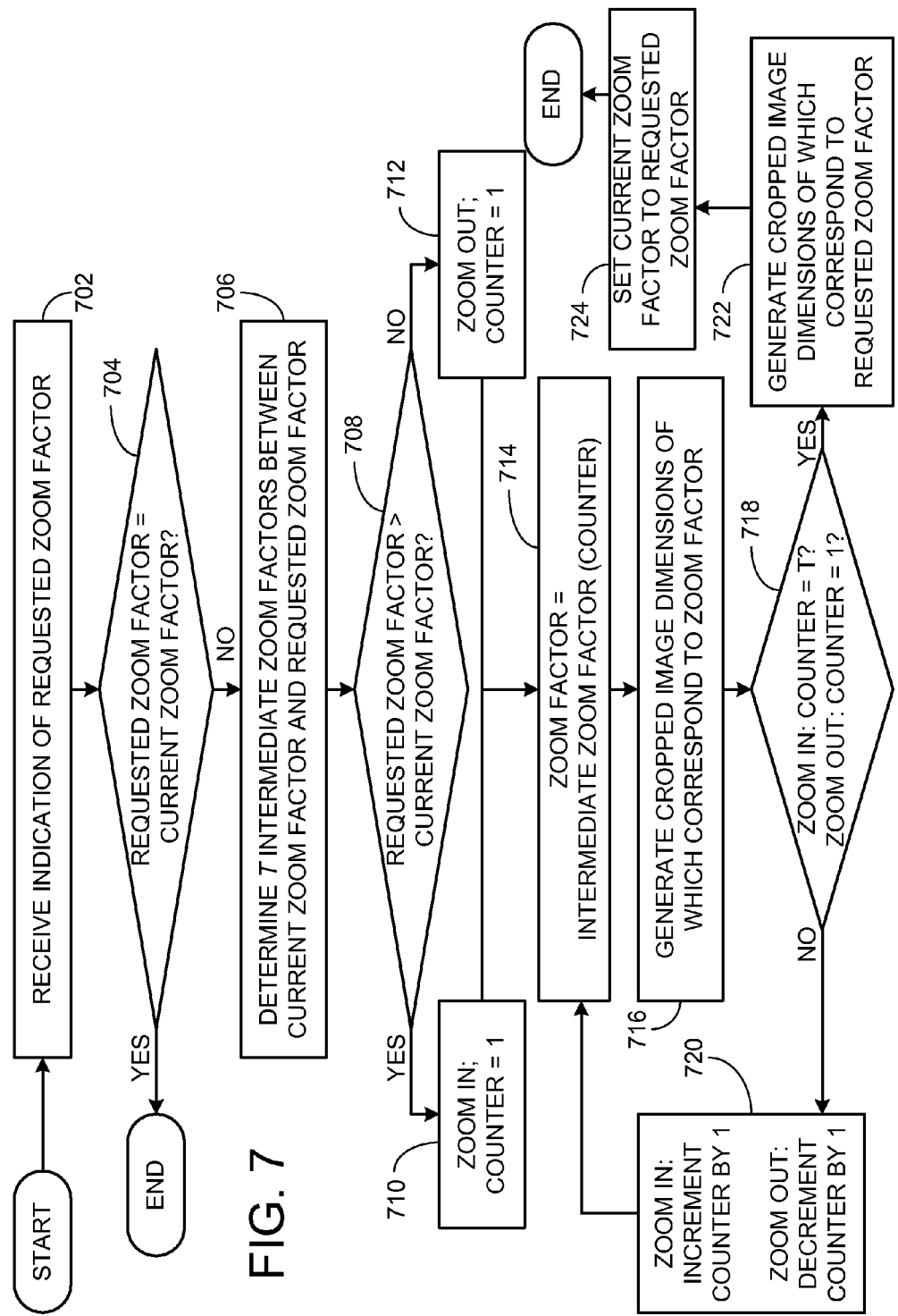
FIG. 7 is a flowchart illustration of a simplified example method for gradual digital zoom implemented in an example image sensor that includes processing capabilities.

FIG. 7 is a flowchart illustration of a simplified example method for gradual digital zoom implemented in an example image sensor that includes processing capabilities. At 702, the image sensor receives an indication of a requested zoom factor, for example, by having the indication written to a control register of the image sensor. At 704, the image sensor checks whether the requested zoom factor is equal to a current zoom factor effected in the image sensor. If so, then the method ends. If not, then at 706, the image sensor determines a positive integer T of intermediate zoom factors between the current zoom factor and the requested zoom factor. The intermediate zoom factors are indexed 1 through T, with the lowest intermediate zoom factor indexed 1, and the highest intermediate zoom factor indexed T. At 708, the image sensor checks whether the requested zoom factor is larger than the current zoom factor. If so, then at 710, the image sensor determines that the zoom is a zoom in and sets the counter to 1. If not, then at 712, the image sensor determines that the zoom is a zoom out and sets the counter to T. From 710 or 712, the method proceeds to 714, where the image sensor sets a zoom factor parameter to the intermediate zoom factor indexed by the counter. At 716, the image sensor generates a cropped image, where the dimensions of the cropped image correspond to the value of the zoom factor parameter. At 718, the image sensor checks whether the value of the counter is equal to T (for zoom in) or 1 (for zoom out). If not, then at 720, the image sensor increments the counter by 1 for zoom in or decrements the counter by 1 for zoom out, and the method resumes from 714. If so, then at 722, the image sensor generates a cropped image, where the dimensions of the cropped image correspond to the requested zoom factor, at 724, the image sensor sets the current zoom factor to the requested zoom factor, and the method ends.

Let X−1 represent the number of supported zoom factors between the start zoom factor and the end zoom factor. Then X steps are needed to get from the start zoom factor to the end zoom factor, where each step is from a zoom factor in the discrete set supported by the image sensor to its next zoom factor in the discrete set. If the supported zoom factors are in fixed increments of size increment, then X=|(EndZoomFactor−StartZoomFactor)|/increment.

Let T, a positive integer, represent the number of intermediate zoom factors between the start zoom factor and the end zoom factor; then there are T+1 transitions from the start zoom factor through the T intermediate zoom factors to the end zoom factor. The X steps from the start zoom factor to the end zoom factor are distributed among the T+1 transitions. In version 1 described below, the steps are distributed to achieve an approximately even distribution of digital zoom level among the transitions. In version 2 described below, the steps are distributed to achieve an approximately even distribution of steps among the transitions. However, other versions, in which the steps are distributed among the transitions in any desired manner, are also contemplated.

In one implementation, intermediate zoom factors are used for all pairs of adjacent offered digital zoom levels. The same number of intermediate zoom factors may be used for all pairs of adjacent offered digital zoom levels. Alternatively, the number of intermediate zoom factors used for one pair of adjacent offered digital zoom levels may differ from the number of intermediate zoom factors used for another pair of adjacent offered digital zoom levels. Tables 10 and 11 below provide examples where the same number of intermediate zoom factors are used for all pairs of adjacent offered digital zoom levels.

In another implementation, intermediate zoom factors are used for at least one pair of adjacent offered digital zoom levels and are not used for at least one other pair of adjacent offered digital zoom levels. Table 5 below provides an example where intermediate zoom factors are used for some pairs of adjacent offered digital zoom levels and are not used for at least one other pair of adjacent offered digital zoom levels. If intermediate zoom factors are used for two or more pairs of adjacent offered digital zoom levels, the same number of intermediate zoom factors may be used for those pairs of adjacent offered digital zoom levels. Alternatively, the number of intermediate zoom factors used for one of those pairs of adjacent offered digital zoom levels may differ from the number of intermediate zoom factors used for another of those pairs of adjacent offered digital zoom levels.

As mentioned above, the image sensor may generate both the cropped image and the preview image, in which case the image sensor is capable of implementing a scaling algorithm. Alternately, the image sensor may generate the cropped image, and the host device may generate the preview image from the cropped image by implementing a scaling algorithm. The image sensor may be configurable by the host device as to whether or not the image sensor generates the preview image. In some implementations, the cropped image is generated by the host device from output of the image sensor.

The use of gradual digital zoom as described herein may be implemented to affect only the preview image. In such an implementation, the recordable image as recorded in a storage medium may be unaffected by any intermediate zoom factors. Generation of the recordable image may be delayed by the host device until the image sensor has completed a change to a zoom factor corresponding to an offered digital zoom level.

The use of gradual digital zoom as described herein may provide a smoother zoom experience when changing between adjacent offered digital zoom levels as perceived by a user viewing the preview images than zooming directly between adjacent offered digital zoom levels. The use of gradual digital zoom as described herein may provide a visual effect similar to that experienced when using optical zoom. Optical zoom generally involves mechanical motion of optical elements, and the use of gradual digital zoom as described herein may provide a user viewing the preview images with a "mechanical" impression to the change. Consider the situation where the change from one offered digital zoom level to another is a result of input through a user input component such as a trackball. As the user rolls the trackball from a first position to a second position, the host device interprets this rolling as a request to change from the current offered digital zoom level (corresponding to the first position) to an adjacent offered digital zoom level (corresponding to the second position). By generating preview images at intermediate digital zoom levels, the user may experience that those preview images correspond to positions intermediate to the first position and the second position, resulting in a mechanical impression.

Version 1: Gradual Digital Zoom Levels

With gradual digital zoom levels, T intermediate digital zoom levels are chosen to be distributed generally evenly between the start offered digital zoom level and the end offered digital zoom level. In other words, an absolute difference in digital zoom level from the start offered digital zoom level to the end offered digital zoom level, divided by T+1, is approximately equal to the absolute difference in digital zoom level for any pair of adjacent digital zoom levels in the set consisting of the start offered digital zoom level, the T intermediate digital zoom levels, and the end offered digital zoom level. For example, if the start offered digital zoom level is 1.00× and the end offered digital zoom level is 1.99× and T equals 3, then the intermediate digital zoom levels are 1.25×, 1.50×, and 1.75×.

Intermediate zoom factors supported by the image sensor and providing cropped image dimensions closest to the intermediate digital zoom levels are then identified. For example, as shown in Table 4 below, the supported zoom factor 2.00 yields cropped image dimensions for a digital zoom level 1.26×, the supported zoom factor 2.60 yields cropped image dimensions for a digital zoom level 1.49×, and the supported zoom factor 3.10 yields cropped image dimensions for a digital zoom level 1.75×.

TABLE 4

| Label | Offered Digital Zoom Level | Digital Zoom Level | Zoom Factor | Dimensions of Cropped Image | |
|---|---|---|---|---|---|
| | | | | Width | Height |
| 1.00x | 1.00x | 1.00x | 1.00 | 1600 | 1200 |
| 1.25x | — | 1.26x | 2.00 | 1270 | 950 |
| 1.50x | — | 1.49x | 2.60 | 1078 | 806 |
| 1.75x | — | 1.75x | 3.10 | 916 | 686 |
| 2.00x | 1.99x | 1.99x | 3.45 | 804 | 602 |

Optional intermediate labels 1.25×, 1.50× and 1.75× are listed in Table 4. Although the host device may be designed not to permit a user to select an intermediate label when choosing an offered digital zoom level, the host device may display an intermediate label along with the preview image that is a scaled-down version of the cropped image generated by the image sensor at the supported zoom factor corresponding to that intermediate label.

The steps from the start zoom factor to the end zoom factor are distributed among the T+1 transitions to achieve an approximately even distribution of digital zoom level among the transitions.

Consider the example where the digital zoom is currently at offered digital zoom level 1.00×, to which the label "1.00×" is assigned, and input detected by the host device from its user input component is indicative of offered digital zoom level 1.99×, to which the label "2.00×" is assigned. The host device may control the image sensor via the commands of the image sensor to adjust the image sensor from zoom factor 1.00 to zoom factor 3.45 via the intermediate zoom factors 2.00, 2.60 and 3.10. If the zoom factors in the set supported by the image sensor are in incremental steps of 0.05, then 49 steps are needed to get from zoom factor 1.00 to zoom factor 3.45. For example, the host device may configure ZoomJumpSize to a value that corresponds to 20 steps and issue the ZoomJumpIn command to the image sensor. Once the image sensor has completed the change to zoom factor 2.00, the host device may configure ZoomJumpSize to a value that corresponds to 12 steps and issue the ZoomJumpIn command to the image sensor. Once the image sensor has completed the change to zoom factor 2.60, the host device may configure ZoomJumpSize to a value that corresponds to 10 steps and issue the ZoomJumpIn command to the image sensor. Once the image sensor has completed the change to zoom factor 3.10, the host device may configure ZoomJumpSize to a value that corresponds to 7 steps and issue the ZoomJumpIn command to the image sensor.

Figures 1, 8:
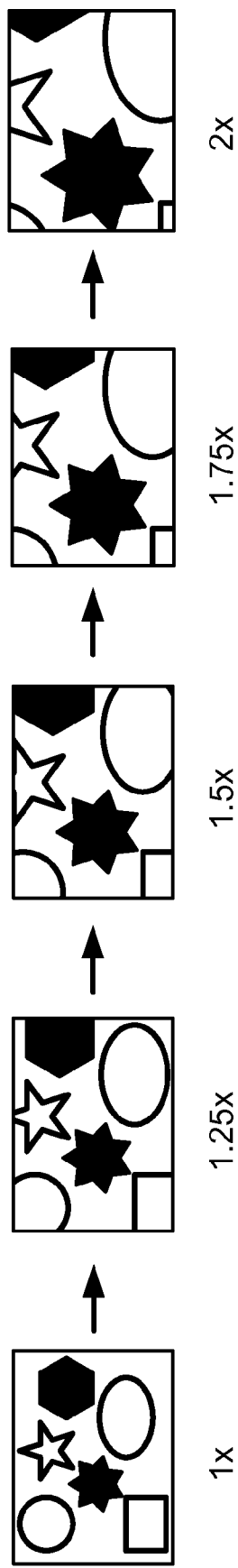
Figures 2, 8:
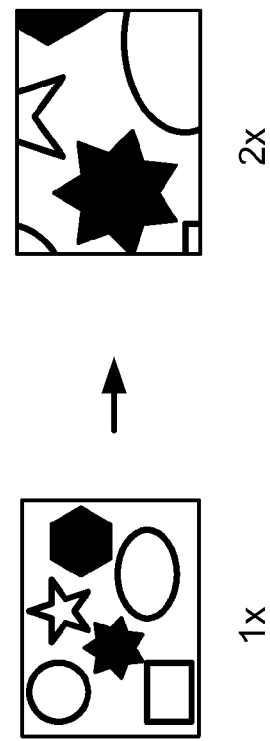

FIG. 8-1 is an illustration of a sequence of example preview images that are scaled-down versions of example cropped images obtained when example digital camera functionality is operated at digital zoom levels 1×, 1.25×, 1.5×, 1.75× and 2×. FIG. 8-2 is an illustration of a sequence of example preview images that are scaled-down versions of example cropped images obtained when the example digital camera functionality is operated at digital zoom levels 1× and 2×. It is clear that a user looking at the sequence of preview images illustrated in FIG. 8-1 will perceive a smoother zoom from digital zoom level 1× to digital zoom level 2× than a user looking at the sequence of preview images illustrated in FIG. 8-2.

Version 2: Gradual Zoom Factors

With gradual zoom factors, T intermediate zoom factors are chosen to be distributed generally evenly between the start zoom factor (corresponding to a start offered digital zoom level) and the end zoom factor (corresponding to a second offered digital zoom level). For example, if the start zoom factor is 4.30 and the end zoom factor is 4.70 and T equals 1, then the intermediate zoom factor is 4.50.

If the zoom factors in the set supported by the image sensor are in incremental steps of 0.05, then 49 steps are needed to get from zoom factor 1.00 to zoom factor 3.45. If T equals 2, then the 49 steps may be distributed as 16+16+17, so that the intermediate zoom factors are 1.80 and 2.60. Alternatively, the 49 steps may be distributed as 17+16+16 or as 16+17+16, both of which will yield different choices for the intermediate zoom factors.

Example intermediate zoom factors are shown in Table 5 below, where T equals 2 for the (1×, 1.99×) pair of adjacent offered digital zoom levels, T equals 1 for the (1.99×, 3.02×) pair and (3.02×, 3.99×) pair of adjacent offered digital zoom levels, and T equals 0 for the (3.99×, 5×) pair of adjacent offered digital zoom levels.

TABLE 5

| Label | Offered Digital Zoom Level | Digital Zoom Level | Zoom Factor | Dimensions of Cropped Image | |
|---|---|---|---|---|---|
| | | | | Width | Height |
| 1x | 1.00x | 1.00x | 1.00 | 1600 | 1200 |
| 1.33x | — | 1.20x | 1.80 | 1336 | 1000 |
| 1.67x | — | 1.49x | 2.60 | 1078 | 806 |
| 2x | 1.99x | 1.99x | 3.45 | 804 | 602 |
| 2.5x | — | 2.37x | 3.85 | 676 | 506 |
| 3x | 3.02x | 3.02x | 4.30 | 530 | 396 |
| 3.5x | — | 3.22x | 4.50 | 498 | 372 |
| 4x | 3.99x | 3.99x | 4.70 | 402 | 300 |
| 5x | 5.00x | 5.00x | 5.00 | 320 | 240 |

Optional intermediate labels 1.33×, 1.67×, 2.5× and 3.5× are listed in Table 5. Although the host device may be designed not to permit a user to select an intermediate label when choosing an offered digital zoom level, the host device may display an intermediate label along with the preview image that is a scaled-down version of the cropped image generated by the image sensor at the supported zoom factor corresponding to that intermediate label.

The steps from the start zoom factor to the end zoom factor are distributed among the T+1 transitions to achieve an approximately even distribution of steps among the transitions.

Consider the example where the digital zoom is currently at offered digital zoom level 1.99×, to which the label "2×" is assigned, and input detected by the host device from its user input component is indicative of offered digital zoom level 3.02×, to which the label "3×" is assigned. The host device may control the image sensor via the commands of the image sensor to adjust the image sensor from zoom factor 3.45 to zoom factor 4.30 via the intermediate zoom factor. If the zoom factors in the set supported by the image sensor are in incremental steps of 0.05, then 17 steps are needed to get from zoom factor 3.45 to zoom factor 4.30. For example, the host device may configure ZoomJumpSize to a value that corresponds to 8 steps and issue the ZoomJumpIn command to the image sensor. Once the image sensor has completed the change to zoom factor 3.85, the host device may configure ZoomJumpSize to a value that corresponds to 9 steps and issue the ZoomJumpIn command to the image sensor.

Additional Considerations for Version 2: Distribution of Steps

The number of steps from zoom factor 1.00 to zoom factor 3.45 when the set of supported zoom factors has increments of 0.05 is 49. As noted above, if T equals 2, then the 49 steps may be distributed generally evenly as 16+16+17, as 17+16+16, or as 16+17+16. If the largest number of steps is used at the start of the change in zoom factors, then the distribution of steps is referred to as "front-end loaded". If the largest number of steps is used at the end of the change in zoom factors, then the distribution of steps is referred to as "back-end loaded".

For example, a front-end loaded distribution for a change from zoom factor 1.00 to zoom factor 3.45 is 17+16+16, and is implemented by transitioning from zoom factor 1.00 to zoom factor 1.85 to zoom factor 2.65 to zoom factor 3.45. Similarly, a front-end loaded distribution for a change from zoom factor 3.45 to zoom factor 1.00 is 17+16+16, and is implemented by transitioning from zoom factor 3.45 to zoom factor 2.60 to zoom factor 1.80 to zoom factor 1.00. In another example, a back-end loaded distribution for a change from zoom factor 1.00 to zoom factor 3.45 is 16+16+17, and is implemented by transitioning from zoom factor 1.00 to zoom factor 1.80 to zoom factor 2.60 to zoom factor 3.45. Similarly, a back-end loaded distribution for a change from zoom factor 3.45 to zoom factor 1.00 is 16+16+17, and is implemented by transitioning from zoom factor 3.45 to zoom factor 2.65 to zoom factor 1.85 to zoom factor 1.00.

A host device, or an image sensor capable of implementing gradual digital zoom internally, may be configured or designed to use solely back-end loaded distributions of steps when a perfectly even distribution of steps is not possible. If a perfectly even distribution of steps is not possible, then different intermediate zoom factors will be used for a gradual digital zoom in (increase in digital zoom level) than for a gradual zoom out (decrease in digital zoom level).

A host device, or an image sensor capable of implementing gradual digital zoom internally, may be configured or designed to use solely front-end loaded distributions of steps when a perfectly even distribution of steps is not possible. If a perfectly even distribution of steps is not possible, then different intermediate zoom factors will be used for a gradual digital zoom in (increase in digital zoom level) than for a gradual zoom out (decrease in digital zoom level).

In the foregoing description, the phrase "generally evenly" was used to describe the distribution of steps among the T+1 transitions. Back-end loaded distributions of 23 steps among 3 transitions include both 7+7+9 and 7+8+8, and both such distributions are considered to be distributed "generally evenly" as used herein. Similarly, front-end loaded distributions of 32 steps among 3 transitions include both 12+10+10 and 11+11+10, and both such distributions are considered to be distributed "generally evenly" as used herein. However, a distribution of 23 steps among 3 transitions as 6+7+10 is not considered to be distributed generally evenly, since 6 is less than 23 divided by 3, ignoring the remainder of the division. In general, any distribution of X steps among T−1 transitions is not considered to be distributed generally evenly if any number in the distribution is less than the quotient of X/(T+1).

Technique 3: Distribution of Offered Digital Zoom Levels

Consider the digital zoom levels and dimensions of cropped images listed in Table 1 above. The ratios of dimensions of cropped images corresponding to pairs of adjacent digital zoom levels in the set {1×, 2×, 3×, 4×, 5×} are not substantially equal to one another. The dimensions of the cropped image at digital zoom level 2× are 0.5 times the dimensions of the cropped image at digital zoom level 1×. The dimensions of the cropped image at digital zoom level 3× are 0.67 times the dimensions of the cropped image at digital zoom level 2×. The dimensions of the cropped image at digital zoom level 4× are 0.75 times the dimensions of the cropped image at digital zoom level 3×. The dimensions of the cropped image at digital zoom level 5× are 0.8 times the dimensions of the cropped image at digital zoom level 4×. The transition from digital zoom level 1× to digital zoom level 2× is therefore a bigger change than the transition from digital zoom level 4× to digital zoom level 5×.

Version 1: Offered Digital Zoom Levels at Equal Spacing of Zoom Factors

A set of offered digital zoom levels may be selected so that the absolute difference in zoom factors corresponding to any pair of adjacent offered digital zoom levels in the set is equal to the absolute difference in zoom factors corresponding to any other pair of adjacent offered digital zoom levels in the set. An example set of offered digital zoom levels and dimensions of cropped images corresponding to those digital zoom levels is listed in Table 6 below.

TABLE 6

| Label | Offered Digital Zoom Level | Zoom Factor | Dimensions of Cropped Image | |
|---|---|---|---|---|
| | | | Width | Height |
| 1× | 1.00× | 1.00 | 1600 | 1200 |
| 2× | 1.26× | 2.00 | 1270 | 950 |
| 3× | 1.69× | 3.00 | 948 | 710 |
| 4× | 2.56× | 4.00 | 626 | 468 |
| 5× | 5.00× | 5.00 | 320 | 240 |

In this example, the absolute difference in zoom factors corresponding to any pair of adjacent offered digital zoom levels is 1.00. However, sets of adjacent offered digital zoom levels with other values for the absolute difference in zoom factors corresponding to any pair of adjacent offered digital zoom levels are also contemplated.

The host device may assign a label to each offered digital zoom level. Examples of such labels are included in the left-most column of Table 6 above. However, persons of ordinary skill in the art will recognize that the label "3×" in Table 6 corresponds to a digital zoom level of 1.69×, and not to a digital zoom level of 3×.

The offered digital zoom levels will affect both the preview image and the recordable image, since they affect the dimensions of the cropped image. Since the changes in the dimensions of the cropped image are more evenly spread among the offered digital zoom levels, zooming from 1.00× to 5.00× with this set of offered digital zoom levels will appear smoother than zooming from 1.00× to 5.00× with the set {1×, 2×, 3×, 4×, 5×} of offered digital zoom levels.

It is also contemplated that adjacent offered digital zoom levels that satisfy the condition that any pair of those adjacent offered digital zoom levels differ by a fixed absolute zoom factor difference form a subset of the complete set of offered digital zoom levels, and that other offered digital zoom levels in the complete set do not satisfy this condition.

Version 2: Optically Uniform Digital Zoom Levels

A set of digital zoom levels is considered optically uniform if, for any pair of adjacent digital zoom levels in the set, a ratio of cropped image dimensions corresponding to a larger zoom level in the pair to cropped image dimensions corresponding to a smaller zoom level in the pair is substantially equal to a ratio of cropped image dimensions corresponding to a larger zoom level in any other pair of adjacent digital zoom levels in the set to cropped image dimensions corresponding to a smaller zoom level in the other pair.

An example optically uniform set of digital zoom levels and dimensions of cropped images corresponding to those digital zoom levels is listed in Table 7 below.

TABLE 7

| Label | Digital Zoom Level | Dimensions of Cropped Image | |
|---|---|---|---|
| | | Width | Height |
| 1x | 1.00x | 1600 | 1200 |
| 2x | 1.50x | 1070 | 802 |
| 3x | 2.23x | 716 | 537 |
| 4x | 3.34x | 479 | 359 |
| 5x | 5.00x | 320 | 240 |

The dimensions of the cropped images satisfy the following relationships:
1600:1070≈1070:716≈716:479≈479:320
1200:802≈802:537≈537:359≈359:240
where the colon is a mathematical symbol to separate two numbers in a ratio, and ≈ is a mathematical symbol meaning "substantially equal to". Even if the ratios are not precisely identical, as will certainly be the case if the dimensions of the cropped image are altered slightly to account for various implementation constraints, the set is still considered to be optically uniform, hence the use of the phrase "substantially equal to" above.

Note that the example set of optically uniform digital zoom levels, rounded to two decimal places, is {1.00×, 1.50×, 2.23×, 3.34×, 5.00×}. If this is the set of offered digital zoom levels, the host device may assign a label to each offered digital zoom level. Examples of such labels are included in the left-most column of Table 7 above. However, persons of ordinary skill in the art will recognize that the label "3×" in Table 7 corresponds to a digital zoom level of 2.23×, and not to a digital zoom level of 3×.

In more general terms, a set of optically uniform digital zoom levels is achieved with a ratio 1:M, where the multiplier M is given by the following equation:

$$M = (\text{dim}(\text{HighestZoomLevel})/\text{dim}(\text{LowestZoomLevel}))^{\wedge}(1/(\text{NumberOfZoomLevels}-1))$$

where "dim(a)" represents the dimensions of its argument a, "/" represents division, and "$\wedge$" represents the mathematical power function. HighestZoomLevel is the highest zoom level in the set (but not necessarily the maximum offered zoom level), LowestZoomLevel is the lowest zoom level in the set (but not necessarily the minimum offered zoom level), and NumberOfZoomLevels is the number of zoom levels in the set (but not necessarily the total number of offered zoom levels). In other words, the complete set of offered digital zoom levels may contain a subset which is optically uniform. Alternatively, the complete set of offered digital zoom levels may be optically uniform.

The offered digital zoom levels will affect both the preview image and the recordable image, since they affect the dimensions of the cropped image. Zooming between offered digital zoom levels in a set or subset that is optically uniform will provide a smoother zoom experience than zooming between digital zoom levels in the set {1×, 2×, 3×, 4×, 5×} and a smoother zoom experience than zooming between digital zoom levels spread evenly in the zoom factor space.

Optically Uniform Digital Zoom Levels Adjusted to Meet Processor Interface Requirements A processor of a host device in which digital camera functionality is integrated may have certain requirements. For example, the interface to the processor may require byte-alignment. In that case, the width and height of any cropped image should be divisible by four.

An example optically uniform set of digital zoom levels and dimensions of cropped images corresponding to those digital zoom levels, adjusted to meet a byte-alignment requirement, is listed in Table 8 below. Table 8 also includes the example labels of Table 7, and the digital zoom levels, rounded to two decimal places, corresponding to the dimensions of the cropped images.

TABLE 8

| Label | Digital Zoom Level | Dimensions of Cropped Image | |
|---|---|---|---|
| | | Width | Height |
| 1x | 1.00x | 1600 | 1200 |
| 2x | 1.49x | 1072 | 804 |
| 3x | 2.23x | 716 | 536 |
| 4x | 3.33x | 480 | 360 |
| 5x | 5.00x | 320 | 240 |

Some of the digital zoom levels in Table 8 differ slightly from the digital zoom levels in Table 7. This discrepancy is owing to the slight change in the cropped image dimensions from Table 7 to Table 8.

Zoom Factors for Adjusted Optically Uniform Digital Zoom Levels

As explained above, the image sensor may be capable of supporting only a discrete set of zoom factors, each corresponding to dimensions of a cropped image. If cropping to implement digital zooming is performed in the image sensor, then digital zooming is limited by the cropping capabilities of the image sensor.

Some examples of zoom factors supported by an example image sensor capable of producing a captured image of 1600 by 1200 pixels and dimensions of cropped images corresponding to those supported zoom factors are listed in Table 9 below. These examples were selected as having cropped image dimensions closest to and larger than the cropped image dimensions in Table 8. Table 9 also includes the example labels of Table 7, and the digital zoom levels, rounded to two decimal places, corresponding to the dimensions of the cropped images.

TABLE 9

| Label | Digital Zoom Level | Zoom Factor | Dimensions of Cropped Image | |
|---|---|---|---|---|
| | | | Width | Height |
| 1x | 1.00x | 1.00 | 1600 | 1200 |
| 2x | 1.49x | 2.60 | 1078 | 806 |
| 3x | 2.21x | 3.75 | 724 | 542 |
| 4x | 3.22x | 4.45 | 482 | 360 |
| 5x | 5.00x | 5.00 | 320 | 240 |

Some of the digital zoom levels in Table 9 differ slightly from the digital zoom levels in Table 8. This discrepancy is owing to the slight change in the cropped image dimensions from Table 8 to Table 9.

The host device may use zoom translation information to translate between an indication of one of its offered digital zoom levels and a zoom factor supported by its image sensor. To continue the example of Table 9, a zoom translation table comprising the left-most and middle columns of Table 9 may be used. The zoom translation table is repeated below as Table 10.

TABLE 10

| Label | Zoom Factor |
|---|---|
| 1x | 1.00 |
| 2x | 2.60 |
| 3x | 3.75 |
| 4x | 4.45 |
| 5x | 5.00 |

Persons of ordinary skill in the art will recognize that the zoom translation information may be stored in any suitable format and not necessarily in tabular format. Further the indication of the offered zoom level corresponding to a particular supported zoom factor may be implicit from the format in which the supported zoom factors (or indications thereof) are stored.

Consider the example where the digital zoom is currently at offered digital zoom level 3.22×, to which the label "4×" is assigned, and input detected by the host device from its user input component is indicative of offered digital zoom level 2.21×, to which the label "3×" is assigned. The host device controls the image sensor via the commands of the image sensor to adjust the image sensor from zoom factor 4.45 to zoom factor 3.75. If the zoom factors in the set supported by the image sensor are in incremental steps of 0.05, then 14 steps are needed to get from zoom factor 4.45 to zoom factor 3.75. For example, the host device may configure ZoomJumpSize to a value that corresponds to 14 steps and issue the ZoomJumpOut command to the image sensor.

Combination of Techniques 2 and 3: Gradual Zoom Factors for Adjusted Optically Uniform Offered Digital Zoom Levels An example implementation of back-end loaded gradual zoom factors with T equals 2 for an image sensor having supported zoom factors in increments of 0.05, the image sensor able to produce a captured image of 1600 by 1200 pixels, with five adjusted optically uniform offered digital zoom levels from a minimum offered digital zoom level of 1.00× to a maximum offered digital zoom level of 5.00× is shown in Table 11 below. Table 11 is to be used for zoom in (increase in digital zoom level) operations.

TABLE 11

| Label | Offered Digital Zoom Level | Digital Zoom Level | Zoom Factor | Dimensions of Cropped Image | |
|---|---|---|---|---|---|
| | | | | Width | Height |
| 1.00x | 1.00x | 1.00x | 1.00 | 1600 | 1200 |
| 1.33x | — | 1.11x | 1.50 | 1435 | 1075 |
| 1.67x | — | 1.26x | 2.00 | 1270 | 950 |
| 2.00x | 1.49x | 1.49x | 2.60 | 1078 | 806 |
| 2.33x | — | 1.66x | 2.95 | 966 | 722 |
| 2.67x | — | 1.88x | 3.30 | 852 | 638 |
| 3.00x | 2.21x | 2.21x | 3.75 | 724 | 542 |
| 3.33x | — | 2.49x | 3.95 | 644 | 480 |
| 3.67x | — | 2.77x | 4.15 | 578 | 432 |
| 4.00x | 3.22x | 3.22x | 4.45 | 482 | 360 |
| 4.33x | — | 3.69x | 4.60 | 434 | 324 |
| 4.67x | — | 4.16x | 4.75 | 386 | 288 |
| 5.00x | 5.00x | 5.00x | 5.00 | 320 | 240 |

Optional intermediate labels 1.33×, 1.67×, 2.33×, 2.67×, 3.33×, 3.67×, 4.33× and 4.67× are listed in Table 11. Although the host device may be designed not to permit a user to select an intermediate label when choosing an offered digital zoom level, the host device may display an intermediate label along with the preview image that is a scaled-down version of the cropped image generated by the image sensor at the supported zoom factor corresponding to that intermediate label.

The distribution of the steps is shown below:
1.00→2.60 (1.00→1.50→2.00→2.60), 32 steps=10+10+12
2.60→3.75 (2.60→2.95→3.30→3.75), 23 steps=7+7+9
3.75→4.45 (3.75→3.95→4.15→4.45), 14 steps=4+4+6
4.45→5.00 (4.45→4.60→4.75→5.00), 11 steps=3+3+5

Consider the example where the digital zoom is currently at offered digital zoom level 1.49×, to which the label "2×" is assigned, and input detected by the host device from its user input component is indicative of offered digital zoom level 2.21×, to which the label "3×" is assigned. The host device controls the image sensor via the commands of the image sensor to adjust the image sensor from zoom factor 2.60 to zoom factor 3.75 via the intermediate zoom factors 2.95 and 3.30. For example, if the zoom factors in the set supported by the image sensor are in incremental steps of 0.05, the host device may configure ZoomJumpSize to a value that corresponds to 7 steps and issue the ZoomJumpIn command to the image sensor. Once the image sensor has completed the change to zoom factor 2.95, the host device may configure ZoomJumpSize to a value that corresponds to 7 steps and issue the ZoomJumpIn command to the image sensor. Once the image sensor has completed the change to zoom factor 3.30, the host device may configure ZoomJumpSize to a value that corresponds to 9 steps and issue the ZoomJumpIn command to the image sensor.

An example implementation of back-end loaded gradual zoom factors with T equals 2 for an image sensor having supported zoom factors in increments of 0.05, the image sensor able to produce a captured image of 1600 by 1200 pixels, with five adjusted optically uniform offered digital zoom levels from a minimum offered digital zoom level of 1.00× to a maximum offered digital zoom level of 5.00× is shown in Table 12 below. Table 12 is to be used for zoom out (decrease in digital zoom level) operations.

TABLE 12

| Label | Offered Digital Zoom Level | Digital Zoom Level | Zoom Factor | Dimensions of Cropped Image | |
|---|---|---|---|---|---|
| | | | | Width | Height |
| 5.00x | 5.00x | 5.00x | 5.00 | 320 | 240 |
| 4.67x | — | 4.44x | 4.85 | 360 | 270 |
| 4.33x | — | 3.99x | 4.70 | 402 | 300 |
| 4.00x | 3.22x | 3.22x | 4.45 | 482 | 360 |
| 3.67x | — | 2.94x | 4.25 | 546 | 408 |
| 3.33x | — | 2.63x | 4.05 | 610 | 456 |
| 3.00x | 2.21x | 2.21x | 3.75 | 724 | 542 |
| 2.67x | — | 1.95x | 3.40 | 820 | 614 |
| 2.33x | — | 1.72x | 3.05 | 932 | 698 |
| 2.00x | 1.49x | 1.49x | 2.60 | 1078 | 806 |
| 1.67x | — | 1.29x | 2.10 | 1238 | 926 |
| 1.33x | — | 1.14x | 1.60 | 1400 | 1048 |
| 1.00x | 1.00x | 1.00x | 1.00 | 1600 | 1200 |

Optional intermediate labels 1.33×, 1.67×, 2.33×, 2.67×, 3.33×, 3.67×, 4.33× and 4.67× are listed in Table 12. Although the host device may be designed not to permit a user to select an intermediate label when choosing an offered digital zoom level, the host device may display an intermediate label along with the preview image that is a scaled-down version of the cropped image generated by the image sensor at the supported zoom factor corresponding to that intermediate label.

The distribution of the steps is shown below:
5.00→4.45 (5.00→4.85→4.70→4.45), 11 steps=3+3+5
4.45→3.75 (4.45→4.25→4.05→3.75), 14 steps=4+4+6
3.75→2.60 (3.75→3.40→3.05→2.60), 23 steps=7+7+9
2.60→1.00 (2.60→2.10→1.60→1.00), 32 steps=10+10+12

Consider the example where the digital zoom is currently at offered digital zoom level 5.00×, to which the label "5×" is assigned, and input detected by the host device from its user input component is indicative of offered digital zoom level 3.22×, to which the label "4×" is assigned. From the perspective of the image sensor, this is really a change from zoom factor 5.00 to zoom factor 4.45. The host device controls the image sensor via the commands of the image sensor to adjust the image sensor from zoom factor 5.00 to zoom factor 4.45 via the intermediate zoom factors 4.85 and 4.70. For example, the host device may configure ZoomJumpSize to a value that corresponds to 3 steps and issue the ZoomJumpOut command to the image sensor. Once the image sensor has completed the change to zoom factor 4.85, the host device may issue the ZoomJumpOut command to the image sensor. Once the image sensor has completed the change to zoom factor 4.70, the host device may configure ZoomJumpSize to a value that corresponds to 5 steps and issue the ZoomJumpOut command to the image sensor.

Other combinations of techniques 2 and 3 will be obvious to persons of ordinary skill in the art. For example, version 1 of technique 2 may be combined with optically uniform offered digital zoom levels. In another example, a set of optically uniform offered digital zoom levels may be a subset of a larger set of optically uniform digital zoom levels, and the gradual zoom uses intermediate zoom levels from among the larger set. In yet another example, a set of optically uniform offered digital zoom levels may be combined with the technique of gradual zoom such that the intermediate zoom factors enable optically uniform transitions from one offered digital zoom level to an adjacent offered digital zoom level.

Technique 4: Adjustment of Sharpness

As mentioned above, the image sensor may generate both the cropped image and the preview image, in which case the image sensor is capable of implementing a scaling algorithm. The image sensor may generate the preview image separately from the recordable image. The image sensor may be able to set the sharpness of the preview image, for example, via a preview image sharpness parameter, independently of setting the sharpness of the recordable image. The image sensor generates the preview image at the sharpness determined by the value of the preview image sharpness parameter by processing the captured image. This processing may be done before, during or after any cropping, but must be done before any scaling.

The sharpness of an image may be understood as related to the amount of detail, noise and contrast perceived in the image. An image with higher sharpness will have more contrast, more detailed features and more noise (especially at edges of color changes) than an image with lower sharpness. An image with lower sharpness will appear softer than an image with higher sharpness.

Quantitative measures of sharpness are also known in the art. An edge profile can be created for a digital image, for example, as an average of graph of distance (measured in pixels) versus pixel value (light or bright is higher, dark is lower) for any portion of the digital image in which there is a transition from a region of dark pixels to a region of light pixels (or a transition from a region of light pixels to a region of dark pixels). The quantitative measure "10-to-90%" measures how many pixels in distance are required to change from 10% of the pixel value to 90% of the pixel value. The steeper the slope (and hence the smaller the measure), the sharper the digital image in that portion. It will be appreciated by persons of ordinary skill in the art that similar quantitative measures, for example, "0-to-100%" or "20-to-80%", can be used as quantitative measures of sharpness instead of "10-to-90%".

The edge profile may include a valley (commonly known as "undershoot") or a peak (commonly known as "overshoot") or both. Undershoot will be observed if the edge includes pixels with a pixel value lower than the pixel value of the region of dark pixels. Overshoot will be observed if the edge includes pixels with a pixel value higher than the pixel value of the region of light pixels. Undershoot and overshoot are side effects that are usually observed in cases where a sharpness enhancement function has been applied to the digital image. Too much undershoot or too much overshoot creates an unpleasant effect known in the art as "halo".

It will be appreciated by persons of ordinary skill in the art that a particular sharpness parameter value will be interpreted differently by different image sensors. Nonetheless, increasing the value of a sharpness parameter in the image sensor will increase the sharpness of the image generated by the image sensor, and decreasing the value of the sharpness parameter will decrease the sharpness of the image generated by the image sensor.

The host device may control the image sensor to generate the recordable image at its sharpest, so that detail in the captured image is not lost. When the digital zoom is at the minimum offered digital zoom level, the preview image is a scaled-down version of the captured image. Imperfections in the captured image are reduced by the effect of the scaling algorithms implemented by the image sensor. On the other hand, when the digital zoom is at the maximum offered digital zoom level, the preview image may be identical or close in size to the cropped image.

In practice, images include noise resulting from a variety of sources. Noise in an image may appear, for example, as a speckle or a pixel in a color or shade of gray unrelated to that of its neighboring pixels. The preview image is refreshed at a refresh rate, which may be fixed or variable. For example, the refresh rate may be set to 15 times per second in bright lighting conditions and to 8 times per second in dim lighting conditions. Noise in the preview image may therefore be particularly noticeable by a user, since the noise will differ from one preview image to another, even when the preview images are all at the same offered digital zoom level. As noted above, the higher the sharpness of an image, the more noise in the image.

To reduce noise in the preview image, the host device may associate different sharpness values for the generation of the preview image with the different offered digital zoom levels, so that the lowest of the sharpness values is associated with the minimum offered digital zoom level, increasingly higher sharpness values are associated with increasingly higher offered digital zoom levels, and the highest of the sharpness values is associated with the maximum offered digital zoom level. For example, Table 9 is repeated below as Table 13, with example associated sharpness values for the preview image added in the right-most column

TABLE 13

| Label | Digital Zoom Level | Zoom Factor | Dimensions of Cropped Image | | Sharpness Value |
|---|---|---|---|---|---|
| | | | Width | Height | |
| 1x | 1.00x | 1.00 | 1600 | 1200 | 3 |
| 2x | 1.49x | 2.60 | 1078 | 806 | 3 |
| 3x | 2.21x | 3.75 | 724 | 542 | 4 |
| 4x | 3.22x | 4.45 | 482 | 360 | 7 |
| 5x | 5.00x | 5.00 | 320 | 240 | 26 |

Combination of Technique 2+Technique 4: Adjustment of Sharpness During Gradual Zoom When gradual digital zoom is used, the host device may adjust the image sensor's sharpness value for the generation of the preview image as the host device controls the image sensor to zoom to different intermediate zoom factors. For example, a portion of Table 11 is repeated below as Table 14, with example sharpness values for the preview image added in the right-most column

TABLE 14

| Label | Offered Digital Zoom Level | Digital Zoom Level | Zoom Factor | Sharpness Value |
|---|---|---|---|---|
| 3.00x | 2.21x | 2.21x | 3.75 | 4 |
| 3.33x | — | 2.49x | 3.95 | 5 |
| 3.67x | — | 2.77x | 4.15 | 6 |
| 4.00x | 3.22x | 3.22x | 4.45 | 7 |
| 4.33x | — | 3.69x | 4.60 | 13 |
| 4.67x | — | 4.16x | 4.75 | 19 |
| 5.00x | 5.00x | 5.00x | 5.00 | 26 |

Alternatively, when gradual digital zoom is used in the change from a first offered digital zoom level to a second offered digital zoom level, the host device may use the sharpness value associated with the first offered digital zoom level or the sharpness value associated with the second offered digital zoom level when changing to the intermediate zoom factors.

When zooming in with gradual digital zoom, the host device may use the sharpness value associated with the lower offered digital zoom level for the intermediate zoom factors and may change to the sharpness value associated with the higher offered digital zoom level only in the final transition to the higher offered digital zoom level. Retaining the lower sharpness value during the gradual zoom in may reduce noise in the preview image. For example, a portion of Table 11 is repeated below as Table 15, with example sharpness values for the preview image added in the right-most column.

TABLE 15

| Label | Offered Digital Zoom Level | Digital Zoom Level | Zoom Factor | Sharpness Value |
|---|---|---|---|---|
| 1.00x | 1.00x | 1.00x | 1.00 | 3 |
| 1.33x | — | 1.11x | 1.50 | 3 |
| 1.67x | — | 1.26x | 2.00 | 3 |
| 2.00x | 1.49x | 1.49x | 2.60 | 3 |
| 2.33x | — | 1.66x | 2.95 | 3 |
| 2.67x | — | 1.88x | 3.30 | 3 |
| 3.00x | 2.21x | 2.21x | 3.75 | 4 |
| 3.33x | — | 2.49x | 3.95 | 4 |
| 3.67x | — | 2.77x | 4.15 | 4 |
| 4.00x | 3.22x | 3.22x | 4.45 | 7 |
| 4.33x | — | 3.69x | 4.60 | 7 |
| 4.67x | — | 4.16x | 4.75 | 7 |
| 5.00x | 5.00x | 5.00x | 5.00 | 26 |

Note that as the image sensor is controlled to change from zoom factor 3.75 (corresponding to offered digital zoom level 2.21x to which the label "3.00x" is assigned) to zoom factor 4.45 (corresponding to offered digital zoom level 3.22x to which the label "4.00x" is assigned) via the intermediate zoom factors 3.95 and 4.15, the sharpness value is set by the host device at the lower sharpness value of 4 for the intermediate zoom factors and changed to the higher sharpness value of 7 only for the transition from intermediate zoom factor 4.15 to zoom factor 4.45. Similarly, as the image sensor is controlled to change from zoom factor 4.45 to zoom factor 5.00 (corresponding to offered digital zoom level 5.00x to which the label "5.00x" is assigned) via the intermediate zoom factors 4.60 and 4.75, the sharpness value is set by the host device at the lower sharpness value of 7 for the intermediate zoom factors and changed to the higher sharpness value of 26 only for the transition from intermediate zoom factor 4.75 to zoom factor 5.00.

When zooming out with gradual digital zoom, the host device may use the sharpness value associated with the lower offered digital zoom level for all transitions from the higher offered digital zoom level to the lower offered digital zoom level via the intermediate zoom factors. Using the lower sharpness value during the gradual zoom out may reduce noise in the preview image. For example, a portion of Table 12 is repeated below as Table 16, with example sharpness values for the preview image added in the right-most column

TABLE 16

| Label | Offered Digital Zoom Level | Digital Zoom Level | Zoom Factor | Sharpness Value |
|---|---|---|---|---|
| 5.00x | 5.00x | 5.00x | 5.00 | 26 |
| 4.67x | — | 4.44x | 4.85 | 7 |
| 4.33x | — | 3.99x | 4.70 | 7 |
| 4.00x | 3.22x | 3.22x | 4.45 | 7 |
| 3.67x | — | 2.94x | 4.25 | 4 |
| 3.33x | — | 2.63x | 4.05 | 4 |
| 3.00x | 2.21x | 2.21x | 3.75 | 4 |
| 2.67x | — | 1.95x | 3.40 | 3 |
| 2.33x | — | 1.72x | 3.05 | 3 |
| 2.00x | 1.49x | 1.49x | 2.60 | 3 |
| 1.67x | — | 1.29x | 2.10 | 3 |
| 1.33x | — | 1.14x | 1.60 | 3 |
| 1.00x | 1.00x | 1.00x | 1.00 | 3 |

Note that as the image sensor is controlled to change from zoom factor 5.00 to zoom factor 4.45 via the intermediate zoom factors 4.85 and 4.70, the sharpness value is set by the host device at the lower sharpness value of 7 before starting the gradual zoom out. Similarly, as the image sensor is controlled to change from zoom factor 4.45 to zoom factor 3.75 via the intermediate zoom factors 4.25 and 4.05, the sharpness value is set by the host device at the lower sharpness value of 4 before starting the gradual zoom out.

Combination of Techniques 2+3+4: Adjustment of Sharpness with Back-End Loaded Gradual Zoom Factors Between Adjusted Optically Uniform Offered Digital Zoom Levels Since Tables 14 and 15 are based on Tables 10 and 11, they actually represent an adjustment of sharpness with back-end loaded gradual zoom factors between adjusted optically uniform offered digital zoom levels.

Figure 9:
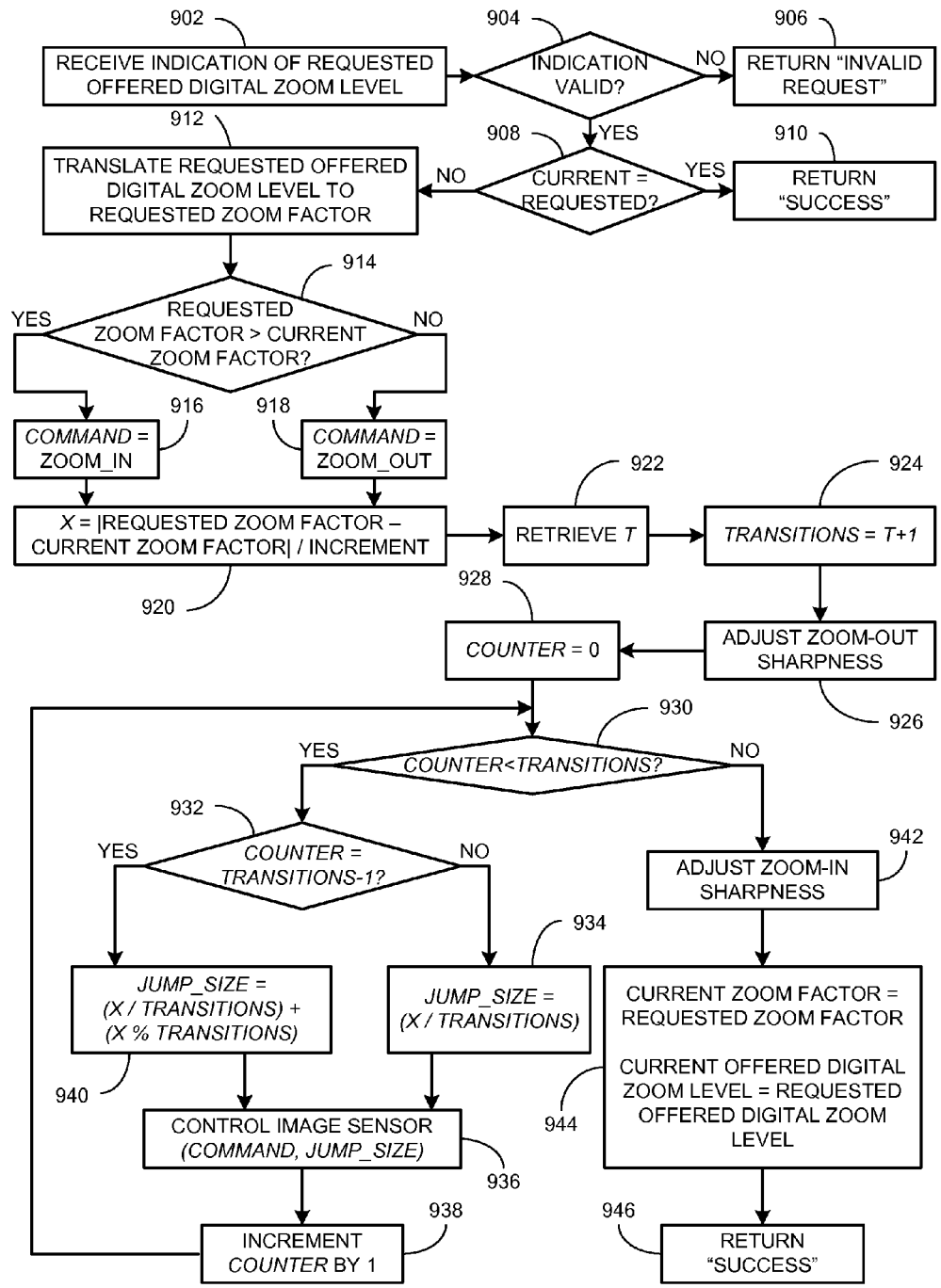
FIG. 9 is a flowchart illustration of a simplified example method for back-end loaded gradual digital zoom with adjusted sharpness values.

FIG. 9 is a flowchart illustration of a simplified example method for gradual zoom between optically uniform digital zoom levels with adjusted sharpness values.

At 902, the host device receives an indication of a requested offered digital zoom level, for example, by detection of the indication by a user input component of the host device. At 904, the host device checks whether the indication is valid. For example, if the indication is such that the requested offered digital zoom level is less than the minimum offered digital zoom level or exceeds the maximum offered digital zoom level, then the indication is invalid. In another example, if the indication is for a digital zoom level that is not offered, then the indication is invalid. If the indication is invalid, then at 906, the host device returns "invalid request" to the camera application.

If the indication is valid, then at 908 the host device checks whether the current offered digital zoom level at which the host device is operating equals the requested offered digital zoom level. If so, then at 910, the host device returns "success" to the camera application.

If not, then at 912, the host device uses its zoom translation information to translate the indication of the requested offered digital zoom level to a requested zoom factor supported by the host device's image sensor.

At 914, the host device checks whether the requested zoom factor is greater than a current zoom factor at which the host device's image sensor is operating. If so, then at 916 the host device sets a command parameter to "zoom in", and if not, then at 918 the host device sets the command parameter to "zoom out". Assuming that the set of discrete zoom factors supported by the host device's image sensor is in fixed increments of size increment, the host device then calculates at 920 the positive number X of steps from the current zoom factor to the requested zoom factor, where "|a|" is the absolute value of the argument a. Assuming that gradual zoom is implemented in the host device with a fixed positive number T of intermediate zoom levels (and hence T intermediate zoom factors) between any pair of adjacent offered digital zoom levels, at 922, the host device retrieves the value T.

At 924, the host device sets a parameter transitions to T+1, so that the jump from the current zoom factor to the requested zoom factor is performed via T intermediate zoom factors.

At 926, the host device adjusts the sharpness value if this is a case of zoom out.

At 928, the host device sets a counter to a value 0. At 930, the host device checks whether the value of counter is less than the value of the parameter transitions. If so, then at 932 the host device checks whether the value of the counter equals 1 subtracted from the value of the parameter transitions. If so, then at 934, the host device sets a parameter Jump_Size to equal the quotient X/transitions. This ensures that the distribution of steps among the transitions is back-end loaded.

At 936, the host device controls its image sensor to perform the command indicated by the command parameter, with a jump of the value of the parameter Jump_Size. At 938, the host device increments the value of counter by 1, and the method continues to 930.

If at 932 the value of the counter is not equal to 1 subtracted from the value of the parameter transitions, then at 940 the host device sets the parameter Jump_Size to equal the quotient X/transitions plus the remainder of dividing X by transitions, and the method continues to 936.

If at 930 the value of the counter is not less than the value of the parameter transitions, then the transitions to the requested offered digital zoom level have been completed. At 942, the host device adjusts the sharpness value if this is a case of zoom out. At 944 the host device updates the current zoom factor and the current offered digital zoom level to the requested zoom factor and the requested offered digital zoom level, respectively, and at 9480, the host device returns "success" to the camera application.

Block Diagrams

Figure 10:
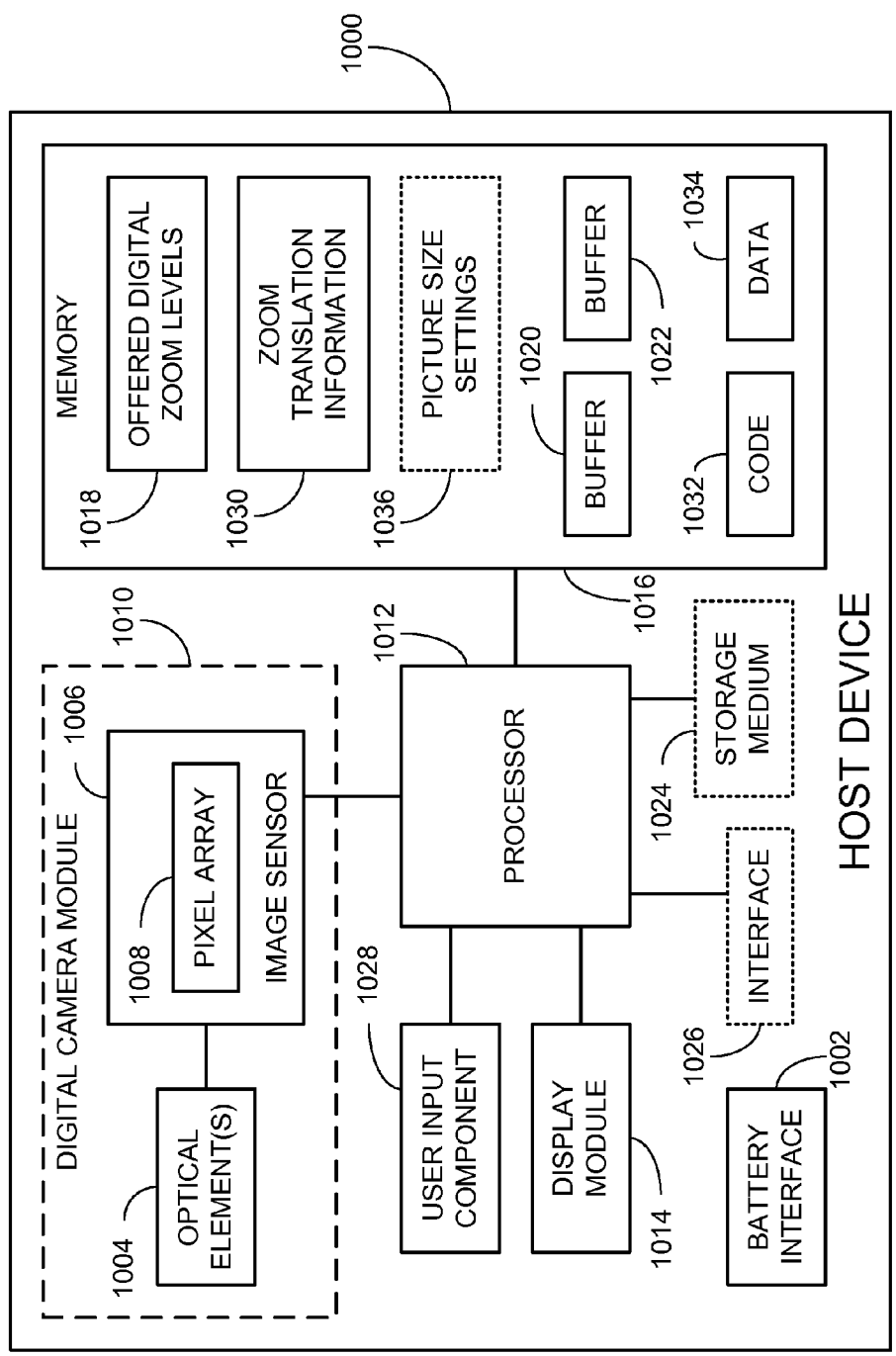
FIG. 10 is a simplified block diagram illustration of an example host device in which digital camera functionality is integrated.

FIG. 10 is a simplified block diagram illustration of an example host device 1000 in which digital camera functionality is integrated. Standalone digital camera 100 and mobile electronic device 200 are both examples of a host device such as illustrated in FIG. 10, and other host devices are also contemplated. Host device 1000 may comprise components, elements, circuitry and/or modules that, for clarity, are not illustrated in FIG. 10. Host device 1000 may be battery-operated and comprises a battery interface 1002 through which a battery (not shown) can power components of host device 1000.

Host device 1000 comprises an arrangement 1004 of one or more optical elements, and an image sensor 1006 optically coupled to arrangement 1004. Image sensor 1006 comprises a pixel array 1008 comprising photosensitive material. Image sensor 1006 is arranged to read a captured image from pixel array 1008. The actual size of the image read from pixel array 1008 will depend on the number of pixels in pixel array 1008 and the sensor mode in which image sensor 1006 is operated. Ultra eXtended Graphics Array (UXGA) and Super Video Graphics Array (SVGA) are two examples for a sensor mode. As mentioned above, the term captured image refers to the image read from the pixel array, discounting any margin or border pixels. For example, an image sensor comprising a pixel array of dimensions 1624 by 1216 and operated in a UXGA mode may read an image of 1608 by 1208 pixels. With a margin of four dummy columns along each edge of the image, the dimensions of the captured image are therefore 1600 by 1200 pixels.

Image sensor 1006 and arrangement 1004 may be packaged together as a digital camera module 1010. A non-exhaustive list of examples for image sensor 1006 includes a charge coupled device (CCD) image sensor and a complementary metal oxide semiconductor (CMOS) image sensor. Image sensor 1006 may include processing capabilities. For example, image sensor 1006 may be a system-on-chip (SOC) image sensor. Alternately, image sensor 1006 may lack processing capabilities.

Host device 1000 comprises a processor 1012 coupled to image sensor 1006, and a display module 1014 coupled to processor 1012. A non-exhaustive list of examples for an element comprised in display module 1014 includes an active matrix, a passive matrix, a thin film transistor (TFT) liquid crystal display (LCD), a thin film diode (TFD) LCD, an organic light emitting diode (OLED), a capacitive touch-screen, a resistive touchscreen, a twisted nematic (TN) display, a super-twisted nematic (STN) display, and the following types of STN displays: color STN (CSTN), double layer STN (DSTN), dual scan STN (DSTN), fast response STN (FRSTN), film compensated STN (FSTN), double film STN (FFSTN), and monochrome STN (MSTN).

Host device 1000 comprises a memory 1016 coupled to processor 1012. Memory 1016 stores indications 1018 of digital zoom levels offered by host device 1000. Memory 1016 comprises at least two buffers. A buffer 1020 is arranged to store a recordable image that is to be recorded in a storage medium. A buffer 1022 is arranged to store a preview image to be displayed by display module 1014. Both the recordable image and the preview image are derived from the captured image.

The storage medium to which a recordable image stored in buffer 1020 is to be recorded may be comprised in host device 1000, illustrated in FIG. 10 as an optional block 1024. Alternatively or additionally, the storage medium to which a recordable image stored in buffer 1020 is to be recorded may be external to host device 1000. Recording of the image in the external storage medium (not shown) may be enabled using an interface of host device 1000, illustrated in FIG. 10 as an optional block 1026. A non-exhaustive list of examples for interface 1026 includes a radio-frequency wireless communication interface, a wired communication interface, a universal serial bus (USB) connector, and an optical interface.

Host device 1000 comprises at least one user input component 1028 coupled to processor 1012. User input component 1028 is able to detect input indicative of one of the digital zoom levels offered by host device 1000. A non-exhaustive list of examples for user input component 1028 includes a trackball, a thumbwheel, a key, a button, a keyboard, a touch-screen, an optical user input component, and an audio user input component such as a microphone.

As mentioned above, image sensor 1006 may be capable of supporting only a discrete set of zoom factors, each corresponding to dimensions of a cropped image. Host device 1000 may use zoom translation information 1030 stored in memory 1016 to translate between an indication of one of its offered digital zoom levels and a zoom factor supported by image sensor 1006. As mentioned above, host device 1000 may associate different sharpness values for the generation of the preview image with the different offered digital zoom levels. The sharpness value associated with an offered digital zoom level may be included in zoom translation information 1030 or elsewhere (not shown) in memory 1016.

Memory 1016 is arranged to store code 1032 that is executable by processor 1012. Code 1032 may comprise firmware or software or any combination thereof. Code 1032 may include an operating system for host device 1000 and applications to be run on host device 1000. For example, code 1032 may provide a graphical user interface that enables a user of host device 1000 to select one of the offered digital zoom levels. Input received via the graphical user interface will result in a change from a current offered digital zoom level to the selected offered digital zoom level, even if the selected offered digital zoom level is not adjacent to the current offered digital zoom level.

Memory 1016 is also arranged to store data 1034. Some of data 1034 may be used in the operation of code 1032. Some of data 1034 may be generated by code 1032 when executed by processor 1012. Memory 1016 may also be arranged to store picture size settings 1036, which affect the size of a recordable image, as described herein. Memory 1016 may comprise removable memory or non-removable memory or any combination thereof. Memory 1016 may comprise volatile memory or non-volatile memory or any combination thereof. Memory 1016 is an example of physical computer-readable media.

As mentioned above, digital zoom is accomplished by cropping an image to retain a center part of the image in the same aspect ratio as the original image and to discard the rest of the image. If the zooming is accomplished in image sensor 1006, then the output of image sensor 1006 includes a cropped image to be stored in buffer 1020 and to be recorded in a storage medium. If the zooming is accomplished by processor 1012, then the output of image sensor 1006 includes the captured image read from pixel array 1008 or a processed version thereof, and the cropped image derived by processor 1012 from the output of image sensor 1006 is stored in buffer 1020 to be recorded in a storage medium.

As mentioned above, the preview image is not necessarily identical to the cropped image. If image sensor 1006 generates both the cropped image and the preview image, then image sensor 1006 is capable of implementing a scaling algorithm. In this case, the output of image sensor 1006 includes a cropped image to be stored in buffer 1020 and to be recorded in a storage medium, and a preview image to be stored in buffer 1022 and to be displayed by display module 1014. If image sensor 1006 generates the cropped image and host device 1006 uses processor 1012 to generate the preview image, then image sensor 1006 need not be capable of implementing a scaling algorithm. If the zooming is accomplished by processor 1012, as described above, then image sensor 1006 need not be capable of implementing a scaling algorithm.

Although display module 1014 is illustrated in FIG. 10 as comprised in host device 1000, in other implementations, display module 1014 may be external to host device 1000 and host device 1000 may comprise an interface (not shown) through which display module 1014 can receive input from host device 1000.

Figure 11:
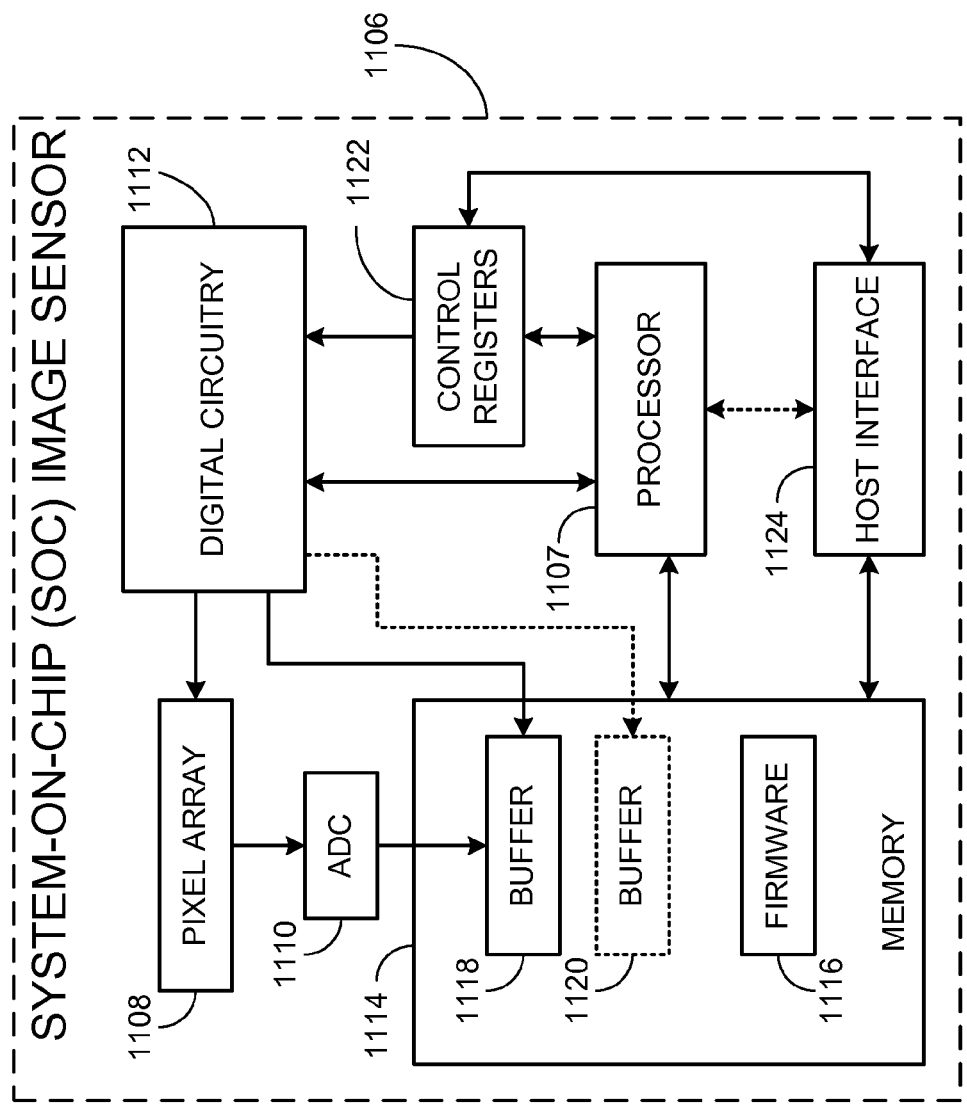
FIG. 11 is a simplified block diagram illustration of an example system-on-chip image sensor.

FIG. 11 is a simplified block diagram illustration of an example system-on-chip image sensor 1106. Image sensor 1106, which is an example of image sensor 1006, may comprise components, elements, circuitry and/or modules that, for clarity, are not illustrated in FIG. 11. Image sensor 1106, being a system-on-chip image sensor, is a single integrated circuit and necessarily comprises a processor 1107. Image sensor 1106 comprises a pixel array 1108 comprising photosensitive material. Image sensor 1106 is arranged to read a captured image from pixel array 1108.

Image sensor 1106 comprises an analog-to-digital converter (ADC) 1110 to convert analog output of pixel array 1108 to digital output. Image sensor 1110 comprises digital circuitry 1112 coupled to pixel array 1108 and to processor 1107. Digital circuitry 1112 comprises digital control circuitry that directly controls the operation of pixel array 1108, since digital circuitry 1112 is able to operate faster than processor 1107.

Image sensor 1106 comprises a memory 1114 coupled to processor 1107. Firmware 1116 of processor 1107 may be stored in memory 1114. Memory 1114 comprises a buffer 1118 in which the digital output of ADC 1110 is stored.

As described herein, some implementations of image sensor 1106 may be able to output two different images, for example, a cropped image and a preview image. For at least this reason, image sensor 1106 may comprise another buffer, illustrated in FIG. 11 as optional block 1120. All or part of the contents of buffer 1118 may be copied to buffer 1120 so that image sensor 1106 is able to process the contents of buffer 1120 independently of the contents of buffer 1118.

The contents of buffer 1118 and optional buffer 1120 may be operated on by firmware 1116 when executed by processor 1107, or by one or more portions of digital circuitry 1112, or by both. For example, firmware 1116 may be able to implement one or more scaling algorithms. In another example, firmware 1116 may enable image sensor 1106 to implement gradual digital zoom internally, as described herein. Digital circuitry 1112 may have non-control functionality implemented therein. A non-exhaustive list of such non-control functionality includes cropping, zooming, derating, panning, conversion of color format and any combination thereof. At least one of firmware 1116 when executed by processor 1107 and digital circuitry 1112 operates on buffer 1118.

Image sensor 1106 comprises one or more control registers 1122 to affect operation of digital circuitry 1112 and processor 1107. For example, any programmable or configurable parameters of image sensor 1106, such as ZoomJumpSize, sensor mode, output dimensions, preview image sharpness, and whether image sensor 1106 generates the preview image, may be stored in control registers 1122. In another example, whether image sensor 1106 is to implement gradual zoom internally may be stored in control registers 1122.

Image sensor 1106 comprises a host interface 1124 coupled to memory 1114 to output contents of buffer 1118 and optional buffer 1120 using Direct Memory Access (DMA), and coupled to the one or more control registers 1122 to enable reading and writing to the one or more control registers 1122. Host interface 1124 may optionally be coupled to processor 1107.

Figure 12:
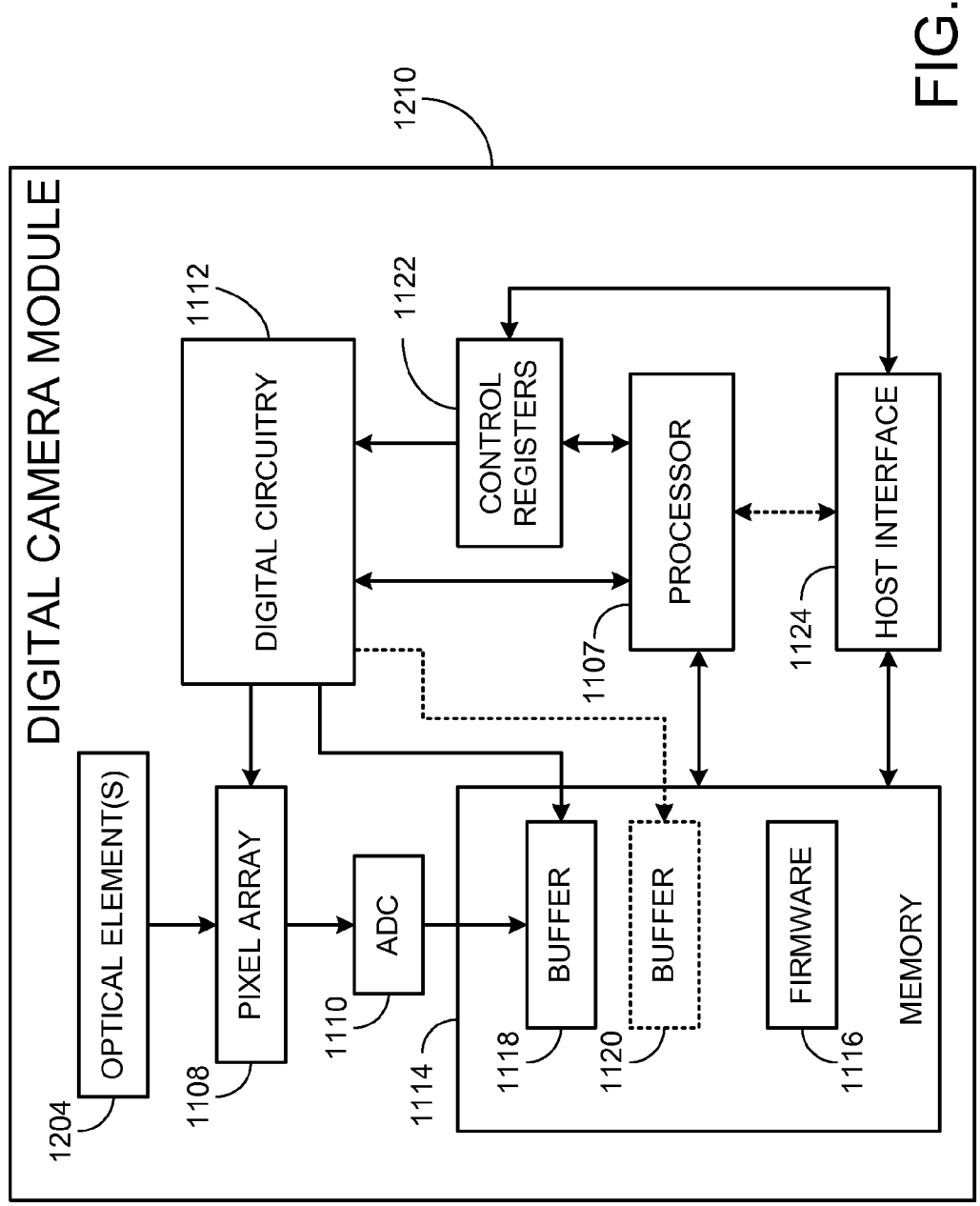
FIG. 12 is a simplified block diagram illustration of an example digital camera module.

FIG. 12 is a simplified block diagram illustration of an example digital camera module 1210. Digital camera module 1210, which is an example of digital camera module 1010, may comprise components, elements, circuitry and/or modules that, for clarity, are not illustrated in FIG. 10. Digital camera module 1210 comprises an arrangement 1204 of one or more optical elements. A non-exhaustive list of examples for an optical element in arrangement 1004 of FIG. 10 or arrangement 1204 in FIG. 12 includes lens, collimator, filter, and polarizer. Digital camera module 1210 comprises processor 1107, pixel array 1108, ADC 1110, digital circuitry 1112, memory 1114, one or more control registers 1122, and host interface 1124, all of which have been described with respect to FIG. 11. Memory 1114 comprises buffer 1118 and may optionally comprise buffer 1120. Firmware 1116 may be stored in memory 1114. Digital camera module 1210 may be enclosed in a housing (not shown) such that arrangement 1204 of one or more optical elements is exposed or exposable, for example, by opening a shutter (not shown), to radiant energy, and such that host interface 1124 is accessible.

Figure 13:
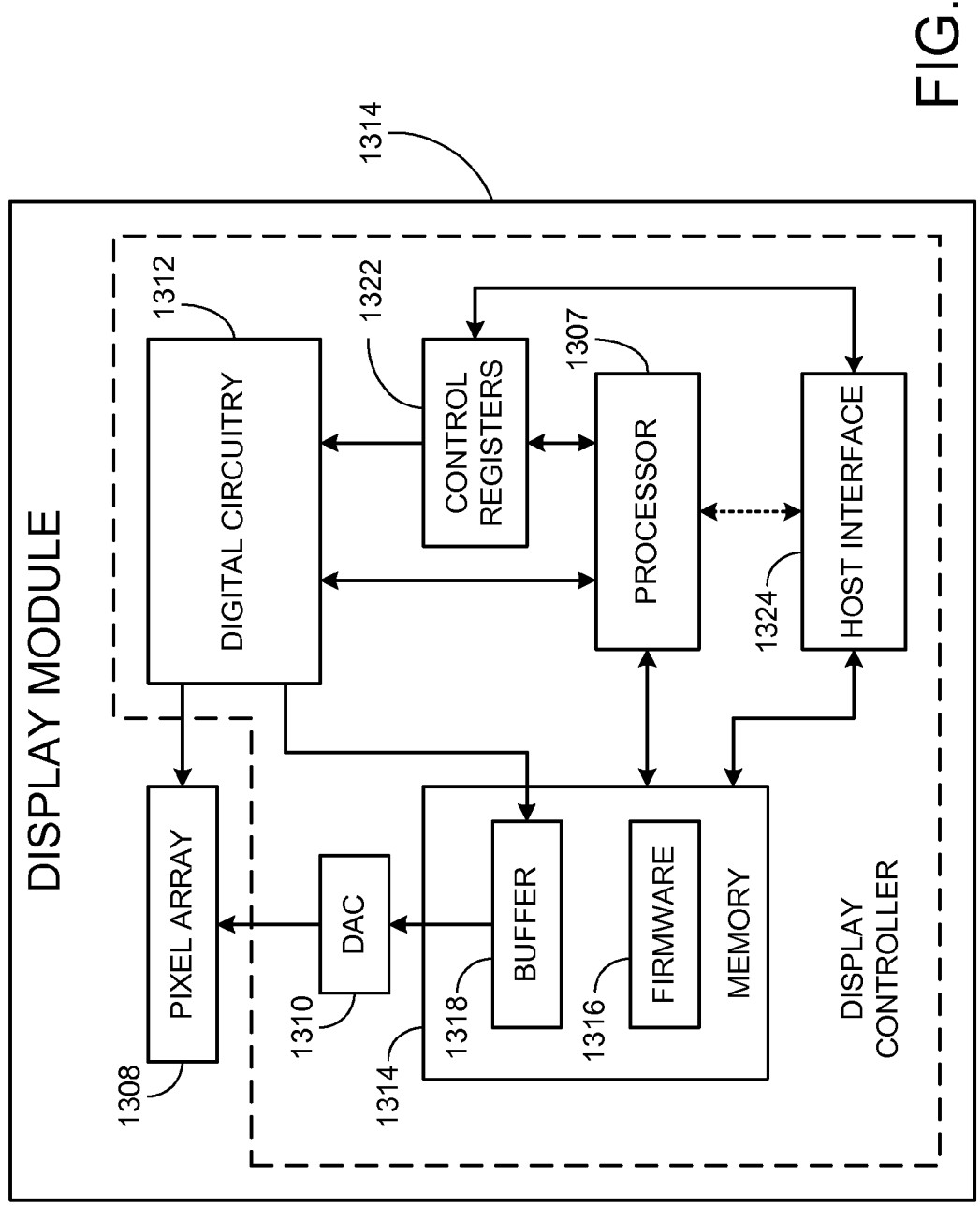
FIG. 13 is a simplified block diagram illustration of an example display module.

FIG. 13 is a simplified block diagram illustration of an example display module 1314. Display module 1314, which is an example of display module 1014, may comprise components, elements, circuitry and/or modules that, for clarity, are not illustrated in FIG. 13. Display module 1314 comprises a processor 1307. Display module 1314 comprises a pixel array 1308. Depending on the technology for pixel array 1308, the pixels may comprise photo-emitting material, or may by controllable, as in LCD technology, to block light or permit the transmission of light in varying degrees. Other technologies for pixel arrays in display modules are known in the art.

Display module 1314 comprises a digital-to-analog converter (DAC) 1310 to convert digital representations of images to analog input for pixel array 1308 to digital output. Display module 1314 comprises digital circuitry 1312 coupled to pixel array 1308 and to processor 1307. Digital circuitry 1312 directly controls the operation of pixel array 1308, since digital circuitry 1312 is able to operate faster than processor 1307.

Display module 1314 comprises a memory 1314 coupled to processor 1307. Firmware 1316 of processor 1307 may be stored in memory 1314. Memory 1314 comprises a buffer 1318 in which the digital input to DAC 1310 is stored.

The contents of buffer 1318 may be operated on by firmware 1316 when executed by processor 1307, or by one or more portions of digital circuitry 1312, or by both.

Display module 1314 comprises one or more control registers 1322 to affect operation of digital circuitry 1312 and processor 1307. For example, whether display module 1314 is being operated in full-screen mode or in a smaller screen mode, may be stored in control registers 1322.

Display module 1314 comprises a host interface 1324 coupled to memory 1314 for input of the contents of buffer 1318 using DMA, and coupled to one or more control registers 1322 to enable reading and writing to the one or more control registers 1322. Host interface 1324 may optionally be coupled to processor 1307.

Elements illustrated in FIG. 13 other than pixel array 1308 may be packaged as a single component, known as a display controller 1326. Display module 1314 may then comprise pixel array 1308 and display controller 1326.

Picture Size

A host device in which digital camera functionality is integrated may offer different picture size settings, for example, "Large", "Medium" and "Small". In an example two-megapixel digital camera, the maximum picture size for a recordable image may be 1600 by 1200 pixels for the "Large" picture size setting, 1024 by 768 for the "Medium" picture size setting, and 640 by 480 for the "Small" picture size setting. The size of a recordable image will depend on the size of the captured image, the size of the cropped image, and on the picture size setting selected via a user input component of the host device. Example cropped image dimensions provided herein have been based on the example of a "Large" picture size setting. It will be obvious to persons of ordinary skill in the art how to modify the dimensions for other picture size settings.

While certain features of the technology have been illustrated and described herein, many modifications, substitutions, changes, and equivalents will now occur to those of ordinary skill in the art. It is, therefore, to be understood that the appended claims are intended to cover all such modifications and changes.

What is claimed is:

1. A host device comprising:
   an arrangement of one or more optical elements;
   an image sensor comprising a pixel array optically coupled to the arrangement of one or more optical elements, the image sensor arranged to read a captured image from the pixel array, the image sensor supporting a discrete set of zoom factors, each of the zoom factors corresponding to dimensions of a cropped image generated by the image sensor when the image sensor is configured for that zoom factor;
   a processor coupled to the image sensor;
   a memory coupled to the processor, the memory arranged to store indications of offered digital zoom levels, each of the offered digital zoom levels corresponding to one of the zoom factors and roughly equal to the square root of the quotient resulting from dividing the area of the captured image by the area of the cropped image; and
   a user input component coupled to the processor to detect input indicative of one of the offered digital zoom levels,
   wherein at least three of the offered digital zoom levels form a set such that zoom factors corresponding to any pair of adjacent offered digital zoom levels in the set have an absolute difference that is equal to the absolute difference in zoom factors corresponding to any other pair of adjacent offered digital zoom levels in the set.

2. The host device of claim 1, wherein the host device comprises a standalone digital camera.

3. The host device of claim 1, wherein the host device comprises a mobile electronic device with digital camera functionality.

4. The host device of claim 1, further comprising a display module coupled to the processor, the memory further comprising:
   a first buffer to store a recordable image which is derived from the captured image; and
   a second buffer to store a preview image which is derived from the captured image and is to be displayed by the display module.

5. A method for digitally zooming, the method comprising:
   initiating a change between a start offered digital zoom level and an end offered digital zoom level that is adjacent to the start offered digital zoom level;
   for each of T intermediate digital zoom levels that are distributed generally evenly between the start offered digital zoom level and the end offered digital zoom level, where T is a positive integer:
   generating a preview image, wherein the preview image is generated from a cropped image derived from a captured image read from a pixel array of an image sensor, and dimensions of the cropped image correspond to the intermediate digital zoom level such that the intermediate digital zoom level is roughly equal to the square root of the quotient resulting from dividing the area of the captured image by the area of the cropped image; and controlling a display module to display the generated preview image, wherein generation of a recordable image at any of the T intermediate digital zoom levels is not permitted.

6. The method of claim 5, wherein an absolute difference in zoom level for the start offered digital zoom level and the end offered digital zoom level, divided by T+1, is approximately equal to an absolute difference in digital zoom level for any pair of adjacent digital zoom levels in a set consisting of the start offered digital zoom level, the T intermediate digital zoom levels, and the end offered digital zoom level.

7. A method for digitally zooming, the method comprising:

initiating a change between a start offered digital zoom level and an end offered digital zoom level that is adjacent to the start offered digital zoom level;

for each of T intermediate digital zoom levels between the start offered digital zoom level and the end offered digital zoom level, where T is a positive integer:

generating a preview image, wherein the preview image is generated from a cropped image derived from a capture image read from a pixel array of an image sensor, and dimensions of the cropped image correspond to the intermediate digital zoom level such that the intermediate digital zoom level is roughly equal to the square root of the quotient resulting from dividing the area of the captured image by the area of the cropped image; and controlling a display module having display dimensions to display the generated preview image, wherein the image sensor supports a discrete set of at least X+1 zoom factors, where X is a positive integer greater than or equal to two, including a start zoom factor corresponding to the start offered digital zoom level, an end zoom factor corresponding to the end offered digital zoom level, and X−1 zoom factors between the start zoom factor and the end zoom factor, wherein the X−1 zoom factors include T intermediate zoom factors distributed generally evenly between the start zoom factor and the end zoom factor, each of the T intermediate zoom factors corresponding to a respective one of the T intermediate digital zoom levels, and wherein generation of a recordable image at any of the T intermediate digital zoom levels is not permitted.

8. The method of claim 7, wherein generating the preview image comprises:

controlling the image sensor to generate the cropped image; and in the event that the dimensions of the cropped image exceed the display dimensions, scaling the cropped image to the display dimensions.

9. The method of claim 7, wherein generating the preview image comprises:

controlling the image sensor to generate the cropped image and, in the event that the dimensions of the cropped image exceed the display dimensions, to scale the cropped image to the display dimensions.

10. The method as claimed in claim 7, wherein a subset of the set consists of the start zoom factor, the end zoom factor and the T intermediate zoom factors, and wherein a number of zoom factors in the set between the start zoom factor and an intermediate zoom factor in the subset that is closest to the start zoom factor is not less than a number of zoom factors in the set between any pair of adjacent zoom factors in the subset.

11. The method as claimed in claim 7, wherein a subset of the set consists of the start zoom factor, the end zoom factor and the T intermediate zoom factors, and wherein a number of zoom factors in the set between the end zoom factor and an intermediate zoom factor in the subset that is closest to the end zoom factor is not less than a number of zoom factors in the set between any pair of adjacent zoom factors in the subset.

* * * * *

UNITED STATES PATENT AND TRADEMARK OFFICE
CERTIFICATE OF CORRECTION

PATENT NO. : 8,704,917 B2
APPLICATION NO. : 13/668475
DATED : April 22, 2014
INVENTOR(S) : Miguel Angel Rodriguez and Sung Ho Hong It is certified that error appears in the above-identified patent and that said Letters Patent is hereby corrected as shown below:

On the title page, item (71), "Assignee: Research in Motion Limited, Waterloo (CA)"
should read
-- Assignee: Research In Motion Limited, Waterloo (CA) --.

In the Specification

Column 5, line 56 reads, "of the captured image to implement digital zooming In such"
should read
-- of the captured image to implement digital zooming. In such --.

Column 13, line 52 reads, "In general, any distribution of X steps among T-1 transitions"
should read
-- In general, any distribution of X steps among T+1 transitions --.

Column 15, line 17 reads, "numbers in a ratio, and is a mathematical symbol meaning"
should read
-- numbers in a ratio, and $\approx$ is a mathematical symbol meaning --.

Column 15, line 40 reads, ""/" represents division, and "○" represents the mathematical"
should read
-- "/" represents division, and "^" represents the mathematical --.

Signed and Sealed this
Twenty-first Day of October, 2014

Michelle K. Lee
*Deputy Director of the United States Patent and Trademark Office*